(12) United States Patent
Tabata et al.

(10) Patent No.: US 7,376,065 B2
(45) Date of Patent: May 20, 2008

(54) OPTICAL RECORDING METHOD, OPTICAL RECORDING APPARATUS AND OPTICAL STORAGE MEDIUM

(75) Inventors: Hiroshi Tabata, Mito (JP); Ikuo Matsumoto, Mito (JP); Kenji Tokui, Hitachinaka (JP); Kazuo Yonehara, Hitachinaka (JP); Kenichi Shimomai, Mito (JP)

(73) Assignee: Victor Company of Japan, Ltd., Kanagawaken (JP)

( * ) Notice: Subject to any disclaimer, the term of this patent is extended or adjusted under 35 U.S.C. 154(b) by 702 days.

(21) Appl. No.: 11/044,844

(22) Filed: Jan. 27, 2005

(65) Prior Publication Data

US 2005/0213461 A1 Sep. 29, 2005

(30) Foreign Application Priority Data

Jan. 30, 2004 (JP) ............................. 2004-023430
Jan. 30, 2004 (JP) ............................. 2004-023431

(51) Int. Cl.
G11B 7/00 (2006.01)
(52) U.S. Cl. ............................. 369/59.11; 369/47.51; 369/116
(58) Field of Classification Search ............ 369/47.51, 369/59.11
See application file for complete search history.

(56) References Cited

FOREIGN PATENT DOCUMENTS

| JP | 2000-155945 | 6/2000 |
|---|---|---|
| JP | 2001-297481 | 10/2001 |
| JP | 2002-092889 | 3/2002 |
| JP | 2002-237089 | 8/2002 |
| JP | 2003-200665 | 7/2003 |
| JP | 2003203340 A | * 7/2003 |

* cited by examiner

Primary Examiner—Thang V. Tran
Assistant Examiner—Jorge L. Ortiz-Criado
(74) Attorney, Agent, or Firm—Renner, Kenner, Greive, Bobak, Taylor & Weber

(57) ABSTRACT

Information to be recorded is recorded in a recording layer of a phase-change optical storage medium. The information to be recorded is modulated to generate modulated data. Desired mark-length data is generated based on the modulated data. Generated further based on the mark-length data is a recording pulse pattern of recording pulses rising from an erasing power and formed between a recording power larger than the erasing power and a bottom power smaller than the erasing power and of erasing pulses rising from the bottom power to the erasing power. A recording light beam is then irradiated onto the recording layer in accordance with the recording pulse pattern to record at least one recorded mark representing the information to be recorded. Used in recording is an optimum erasing power, as the erasing power, the optimum erasing power satisfying an expression (1): $1.000 < (R1/R0) < 1.030 \ldots$ (1) in which $R0$ is a reflectivity exhibited by an un-recorded section of the recording layer, on which no data has ever been recorded, when irradiated with a reproducing light beam, and $R1$ is a reflectivity exhibited by the un-recorded section when irradiated with the reproducing light beam after irradiated once with a beam having the erasing power.

19 Claims, 23 Drawing Sheets

| | ERASING POWER Pe [mW] | REFLECTIVITY [%] | | REFLECTIVITY RATIO | DOW-JITTER CHARACTERISTICS [%] | | | |
|---|---|---|---|---|---|---|---|---|
| | | R0 | R1 | R1/R0 | DOW0 | DOW1 | DOW9 |
| EMBODIMENT SAMPLE A-1 | 4.6 | 17.40 | 17.70 | 1.017 | 6.5 | 8.0 | 7.5 |
| EMBODIMENT SAMPLE A-2 | 3.8 | 17.40 | 17.50 | 1.006 | 6.8 | 8.6 | 7.9 |
| EMBODIMENT SAMPLE A-3 | 5.6 | 17.40 | 17.90 | 1.029 | 7.0 | 8.7 | 8.4 |
| COMPARATIVE SAMPLE A-4 | 6.0 | 17.40 | 18.00 | 1.034 | 8.8 | 10.8 | 9.0 |
| COMPARATIVE SAMPLE A-5 | 3.2 | 17.40 | 17.40 | 1.000 | 9.8 | 11.1 | 10.8 |
| COMPARATIVE SAMPLE A-6 | 6.8 | 17.40 | 18.20 | 1.046 | 8.8 | 12.3 | 9.8 |

| | INITIALIZATION REQUIREMENTS | | | | ERASING POWER [mW] | REFLECTIVITY [%] | | | REFLECTIVITY RATIO | | REFLECTIVITY-RATIO DIFFERENCE | DOW-JITTER CHARACTERISITICS | | |
|---|---|---|---|---|---|---|---|---|---|---|---|---|---|---|
| | POWER [mW] | LINER VELOCITY [m/s] | POWER DENSITY | REFLECTIVITY ZONE | | R0 | R1 | R10 | R1/R0 | R10/R0 | (R10/R0)-(R1/R0) | DOW0 | DOW1 | DOW9 |
| EMBODIMENT SAMPLE B-1 | 1600 | 4.5 | 1.42 | BH | 4.6 | 17.40 | 17.70 | 19.30 | 1.017 | 1.109 | 0.092 | 6.5 | 8.0 | 7.5 |
| EMBODIMENT SAMPLE B-2 | 1700 | 4.5 | 1.51 | BH | 4.6 | 18.40 | 18.50 | 19.30 | 1.005 | 1.049 | 0.043 | 7.0 | 9.2 | 8.5 |
| EMBODIMENT SAMPLE B-3 | 1730 | 4.5 | 1.54 | BH | 4.6 | 18.50 | 18.60 | 19.30 | 1.005 | 1.043 | 0.038 | 7.5 | 9.8 | 8.9 |
| EMBODIMENT SAMPLE B-4 | 1400 | 4.5 | 1.24 | BH | 4.6 | 17.00 | 17.10 | 19.20 | 1.006 | 1.129 | 0.124 | 7.2 | 9.4 | 8.6 |
| EMBODIMENT SAMPLE B-5 | 1360 | 4.5 | 1.21 | BL | 4.6 | 16.70 | 16.80 | 19.20 | 1.006 | 1.150 | 0.144 | 7.9 | 9.9 | 9.0 |
| COMPARATIVE SAMPLE B-6 | 1300 | 4.5 | 1.16 | C | 4.6 | 16.20 | 16.60 | 19.20 | 1.025 | 1.185 | 0.160 | 8.8 | 11.1 | 9.8 |
| COMPARATIVE SAMPLE B-7 | 1600 | 4.0 | 1.60 | C | 4.6 | 18.80 | 18.80 | 19.50 | 1.000 | 1.037 | 0.037 | 12.8 | 10.8 | 9.0 |
| COMPARATIVE SAMPLE B-8 | 1800 | 4.0 | 1.80 | D | 4.6 | 19.60 | 19.60 | 19.80 | 1.000 | 1.010 | 0.010 | 8.6 | 16.3 | 9.6 |

| | Pw | Pe | POWER RATIO ε (=Pe/Pw) | REFLECTIVITY [%] | | REFLECTIVITY RATIO | DOW-JITTER CHARACTERISITICS [%] | | | | |
|---|---|---|---|---|---|---|---|---|---|---|---|
| | | | | R0 | R1 | R1/R0 | DOW0 | DOW1 | DOW9 | DOW10000 |
| EMBODIMENT SAMPLE C-1 | 17.0 | 4.6 | 0.27 | 17.40 | 17.70 | 1.017 | 6.5 | 8.0 | 7.5 | 8.0 |
| EMBODIMENT SAMPLE C-2 | 18.0 | 3.8 | 0.21 | 17.40 | 17.50 | 1.006 | 6.8 | 9.1 | 7.9 | 8.2 |
| EMBODIMENT SAMPLE C-3 | 15.0 | 5.8 | 0.39 | 17.40 | 17.90 | 1.029 | 7.0 | 8.7 | 8.4 | 9.8 |
| COMPARATIVE SAMPLE C-4 | 13.0 | 5.8 | 0.45 | 17.40 | 17.70 | 1.017 | 9.4 | 15.2 | 13.2 | 15.6 |
| COMPARATIVE SAMPLE C-5 | 21.0 | 3.8 | 0.18 | 17.40 | 17.70 | 1.017 | 7.8 | 12.2 | 9.8 | 12.4 |

$0.20 \leq \varepsilon \leq 0.40$

FIG. 19

| | POWER RATIO ε (Pe/Pw) | | | DOW-9 JITTER [%] | | | DOW-1000 REFLECTIVITY |
|---|---|---|---|---|---|---|---|
| | LOW LINEAR VELOCITY(1x) εl | MEDIUM LINEAR VELOCITY(2x) εm | HIGH LINEAR VELOCITY(4x) εh | LOW LINEAR VELOCITY(1x) | MEDIUM LINEAR VELOCITY(2x) | HIGH-LINEAR VELOCITY(4x) | HIGH-LINEAR VELOCITY(4x) |
| EMBODIMENT SAMPLE D-1 | 0.51 | 0.47 | 0.27 | 7.3 | 7.1 | 7.8 | 20.2 |
| EMBODIMENT SAMPLE D-2 | 0.32 | 0.25 | 0.20 | 7.9 | 7.6 | 8.0 | 22.2 |
| EMBODIMENT SAMPLE D-3 | 0.70 | 0.60 | 0.40 | 8.2 | 8.0 | 8.0 | 19.1 |
| COMPARATIVE SAMPLE D-4 | 0.51 | 0.25 | 0.27 | 7.3 | 25.0 | 7.8 | 20.2 |
| COMPARATIVE SAMPLE D-5 | 0.25 | 0.47 | 0.27 | 25.5 | 7.1 | 7.8 | 20.2 |
| COMPARATIVE SAMPLE D-6 | 0.35 | 0.47 | 0.27 | 11.1 | 7.1 | 7.8 | 20.2 |
| COMPARATIVE SAMPLE D-7 | 0.51 | 0.47 | 0.60 | 7.3 | 7.1 | 13.8 | 14.3 |
| COMPARATIVE SAMPLE D-8 | 0.35 | 0.47 | 0.50 | 11.1 | 7.1 | 13.0 | 16.8 |

| | POWER RATIO ε (Pe/Pw) | | | DOW-9 JITTER [%] | | | DOW-1000 REFLECTIVITY |
|---|---|---|---|---|---|---|---|
| | LOW LINEAR VELOCITY(2x) εl | MEDIUM LINEAR VELOCITY(4x) εm | HIGH LINEAR VELOCITY(6x) εh | LOW LINEAR VELOCITY(2x) | MEDIUM LINEAR VELOCITY(4x) | HIGH-LINEAR VELOCITY(6x) | HIGH-LINEAR VELOCITY(6x) |
| EMBODIMENT SAMPLE E-1 | 0.50 | 0.42 | 0.29 | 7.5 | 7.4 | 8.1 | 19.6 |
| EMBODIMENT SAMPLE E-2 | 0.30 | 0.25 | 0.20 | 8.3 | 8.0 | 8.6 | 22.0 |
| EMBODIMENT SAMPLE E-3 | 0.60 | 0.50 | 0.40 | 8.0 | 7.6 | 8.6 | 19.3 |
| COMPARATIVE SAMPLE E-4 | 0.50 | 0.25 | 0.29 | 7.5 | 25.1 | 8.1 | 19.6 |
| COMPARATIVE SAMPLE E-5 | 0.25 | 0.42 | 0.29 | 24.3 | 7.4 | 8.1 | 19.6 |
| COMPARATIVE SAMPLE E-6 | 0.35 | 0.42 | 0.29 | 14.6 | 7.4 | 8.1 | 19.6 |
| COMPARATIVE SAMPLE E-7 | 0.50 | 0.42 | 0.60 | 7.5 | 7.4 | 16.2 | 14.2 |
| COMPARATIVE SAMPLE E-8 | 0.35 | 0.42 | 0.50 | 14.6 | 7.4 | 14.1 | 15.3 |

$\varepsilon l > \varepsilon m > \varepsilon h$

FIG. 21

| | POWER RATIO ε (Pe/Pw) | | α | HIGH LINEAR-VELOCITY(4x) JITTER [%] | | | DOW-1000 REFLECTIVITY | |
|---|---|---|---|---|---|---|---|---|
| | LOW LINEAR VELOCITY(1x) εl | HIGH LINEAR VELOCITY(4x) εh | | DOW0 | DOW1 | DOW9 | | HIGH- LINEAR VELOCITY(4x) |
| EMBODIMENT SAMPLE F-1 | 0.51 | 0.27 | 0.529 | 6.2 | 7.8 | 7.8 | | 20.2 |
| EMBODIMENT SAMPLE F-2 | 0.51 | 0.23 | 0.451 | 7.8 | 9.9 | 9.1 | | 19.5 |
| EMBODIMENT SAMPLE F-3 | 0.51 | 0.40 | 0.784 | 6.5 | 9.8 | 8.3 | | 20.7 |
| EMBODIMENT SAMPLE F-4 | 0.40 | 0.21 | 0.525 | 7.0 | 9.2 | 8.6 | | 18.3 |
| EMBODIMENT SAMPLE F-5 | 0.75 | 0.40 | 0.533 | 7.2 | 8.8 | 8.4 | | 22.6 |
| COMPARATIVE SAMPLE F-6 | 0.51 | 0.20 | 0.392 | 8.6 | 12.3 | 12.1 | | 19.3 |
| COMPARATIVE SAMPLE F-7 | 0.51 | 0.45 | 0.882 | 7.6 | 11.3 | 8.6 | | 17.6 |
| COMPARATIVE SAMPLE F-8 | 0.40 | 0.15 | 0.375 | 9.1 | 15.6 | 15.2 | | 17.2 |
| COMPARATIVE SAMPLE F-9 | 0.40 | 0.34 | 0.850 | 8.4 | 13.2 | 9.6 | | 19.9 |
| COMPARATIVE SAMPLE F-10 | 0.75 | 0.27 | 0.360 | 9.2 | 14.8 | 13.6 | | 20.5 |
| COMPARATIVE SAMPLE F-11 | 0.75 | 0.65 | 0.867 | 8.8 | 12.2 | 9.8 | | 23.5 |

$0.45 < \alpha < 0.80$

FIG. 22

| | POWER RATIO ε (Pe/Pw) | | α | HIGH LINEAR-VELOCITY(6X) JITTER [%] | | | DOW-1000 REFLECTIVITY |
|---|---|---|---|---|---|---|---|
| | LOW LINEAR VELOCITY(2x) εl | HIGH LINEAR VELOCITY(6x) εh | | DOW0 | DOW1 | DOW9 | HIGH-LINEAR VELOCITY(6x) |
| EMBODIMENT SAMPLE G-1 | 0.50 | 0.29 | 0.580 | 7.1 | 9.2 | 8.1 | 19.6 |
| EMBODIMENT SAMPLE G-2 | 0.50 | 0.23 | 0.460 | 9.1 | 9.8 | 9.6 | 17.8 |
| EMBODIMENT SAMPLE G-3 | 0.50 | 0.39 | 0.780 | 8.0 | 9.7 | 9.6 | 18.1 |
| EMBODIMENT SAMPLE G-4 | 0.38 | 0.22 | 0.579 | 7.3 | 9.1 | 8.0 | 18.2 |
| EMBODIMENT SAMPLE G-5 | 0.75 | 0.38 | 0.507 | 7.4 | 9.1 | 7.9 | 22.2 |
| COMPARATIVE SAMPLE G-6 | 0.50 | 0.20 | 0.400 | 9.9 | 12.3 | 12.2 | 17.4 |
| COMPARATIVE SAMPLE G-7 | 0.50 | 0.45 | 0.900 | 8.8 | 13.3 | 12.1 | 13.3 |
| COMPARATIVE SAMPLE G-8 | 0.38 | 0.15 | 0.395 | 9.8 | 15.3 | 12.3 | 15.7 |
| COMPARATIVE SAMPLE G-9 | 0.38 | 0.34 | 0.895 | 9.5 | 11.1 | 9.6 | 18.6 |
| COMPARATIVE SAMPLE G-10 | 0.75 | 0.28 | 0.373 | 9.7 | 14.2 | 13.3 | 21.0 |
| COMPARATIVE SAMPLE G-11 | 0.75 | 0.61 | 0.813 | 9.8 | 12.3 | 9.9 | 23.2 |

| | RECORDING POWER [mW] | | | DOW-9 JITTER [%] | | | DOW-9 MODULATION AMPLITUDE [%] | | |
|---|---|---|---|---|---|---|---|---|---|
| | LOW LINER VELOCITY (1x)Pwl | MEDIUM LINEAR VELOCITY (2x)Pwm | HIGH LINEAR VELOCITY (4x)Pwh | LOW LINER VELOCITY (1x) | MEDIUM LINEAR VELOCITY (2x) | HIGH LINEAR VELOCITY (4x) | LOW LINER VELOCITY (1x) | MEDIUM LINEAR VELOCITY(2x) | HIGH LINEAR VELOCITY (4x) |
| EMBODIMENT SAMPLE H-1 | 14.1 | 16.2 | 17.2 | 7.3 | 7.1 | 7.8 | 60.8 | 64.9 | 65.9 |
| EMBODIMENT SAMPLE H-2 | 15.2 | 15.8 | 16.2 | 7.7 | 7.2 | 8.0 | 61.1 | 63.9 | 63.2 |
| COMPARATIVE SAMPLE H-3 | 14.1 | 16.2 | 15.0 | 7.3 | 7.1 | 11.5 | 60.8 | 64.9 | 56.2 |
| COMPARATIVE SAMPLE H-4 | 14.1 | 13.0 | 17.2 | 7.3 | 12.1 | 7.8 | 60.8 | 52.3 | 65.9 |
| COMPARATIVE SAMPLE H-5 | 17.8 | 16.2 | 17.2 | 10.9 | 7.1 | 7.8 | 60.2 | 64.9 | 65.9 |

Pwl < Pwm < Pwh

FIG. 24

| | RECORDING POWER [mW] | | | DOW-9 JITTER [%] | | | DOW-9 MODULATION AMPLITUDE [%] | | |
|---|---|---|---|---|---|---|---|---|---|
| | LOW LINER VELOCITY (2x)Pwl | MEDIUM LINEAR VELOCITY (4x)Pwm | HIGH LINEAR VELOCITY (6x)Pwh | LOW LINER VELOCITY (2x) | MEDIUM LINEAR VELOCITY (4x) | HIGH LINEAR VELOCITY (6x) | LOW LINER VELOCITY (2x) | MEDIUM LINEAR VELOCITY (4x) | HIGH LINEAR VELOCITY (6x) |
| EMBODIMENT SAMPLE 1-1 | 16.1 | 17.2 | 20.0 | 7.5 | 7.4 | 8.1 | 61.2 | 63.5 | 62.2 |
| EMBODIMENT SAMPLE 1-2 | 15.5 | 16.4 | 18.6 | 8.3 | 8.2 | 9.2 | 60.3 | 61.9 | 60.1 |
| COMPARATIVE SAMPLE 1-3 | 16.1 | 17.2 | 16.6 | 7.5 | 7.4 | 13.6 | 61.2 | 63.5 | 52.8 |
| COMPARATIVE SAMPLE 1-4 | 16.1 | 14.0 | 20.0 | 7.5 | 12.7 | 8.1 | 61.2 | 52.3 | 62.2 |
| COMPARATIVE SAMPLE 1-5 | 21.0 | 17.2 | 20.0 | 11.2 | 7.4 | 8.1 | 58.4 | 63.5 | 62.2 |

Pwl < Pwm < Pwh

FIG. 25

OPTICAL RECORDING METHOD, OPTICAL RECORDING APPARATUS AND OPTICAL STORAGE MEDIUM

CROSS-REFERENCE TO RELATED APPLICATIONS

This application is based on and claims the benefit of priority from the prior Japanese Patent Application No. 2004-023430 filed on Jan. 30, 2004 and Japanese Patent Application No. 2004-023431 filed on Jan. 30, 2004, the entire contents of which are incorporated herein by reference.

BACKGROUND OF THE INVENTION

The present invention relates to an optical recording method, an optical recording apparatus and an optical storage medium, in or from such a storage medium, data being recorded, erased or reproduced with irradiation of a light beam (for example, a laser beam).

Phase-change optical storage media are data-rewritable storage media, such as, recent CD-RW, DVD-RW and DVD-RAM. Especially, DVD-RW and DVD-RAM are used for recording and rewriting a large amount of data, such as video data. Phase-change optical storage media require excellent overwrite characteristics as well as recording characteristics.

Structures of and recording methods for conventional rewritable phase-change optical storage media are as follows:

Phase-change optical storage media have a structure in which at least a dielectric layer, a recording layer, another dielectric layer and a reflective layer are laminated in order on a substrate having a bottom surface to be irradiated with a laser beam carrying a recording or reproducing power, or an erasing power. In a phase-change optical storage medium having such a structure, recording pulses are applied (irradiated) onto a recording layer with a laser beam having a recording power, to melt and rapidly cool down the recording layer, thus forming amorphous recorded marks thereon. Reflectivity of the recorded marks lower than that of the crystalline-phase recording layer allows optical reading of the marks as recorded data. In erasing the recorded marks, a laser beam having a power (erasing power) smaller than the recording power is irradiated onto the recording layer to raise the temperature thereof to a temperature in the range from the crystallization temperature to the melting point to change the recording layer from the amorphous phase to the crystalline phase for erasing the recorded marks, thus overwriting being enabled.

Japanese Unexamined Patent Publication Nos. 2002-237089 and 2003-20065 propose an optical recording method or an optical storage medium in which reflectivity of un-recorded sections is made lower than that of recorded sections for excellent jitter and overwrite characteristics in high-speed recording. However, the inventors of the present invention found that the proposed optical recording method and optical storage medium cannot achieve sufficient overwrite characteristics (particularly characteristics at initial overwriting) at high linear velocity (for example, DVD×4 speed or higher).

Recently appeared are optical storage media applicable to multispeeds (for example, ×4 speed) to DVD×1 speed, which allow recording at linear velocity selected among the multispeeds. For such multispeed applications, Japanese Unexamined Patent Publication No. 2000-155945 proposes a recording method with a power ratio of recording power Pwl to erasing power Pel in low linear-velocity recording lower than that of recording power Pwh to erasing power Peh in high linear-velocity recording. However, this method increases the erasing power Peh in high linear-velocity recording, which makes sections to be crystalline amorphous, thus lowering recording characteristics at initial recording. The inventors of the present invention found higher crystallization speed in recording-film composition or otherwise to avoid amorphous phase tends to cause segregation of recording films due to high erasing power Peh, which lowers reflectivity over repeated recording of 1000 times or more to lower recording characteristics, thus not preferable for overwriting.

Japanese Unexamined Patent Publication No. 2002-92889 proposes a recording method to provide constant erasing power Pe irrespective of recording linear velocity or recording power. The inventors of the present invention, however, found this method cannot provide acceptable recording characteristics over a wide range (from low to high) of linear velocity, each linear velocity having its own optimum erasing-power level.

Japanese Unexamined Patent Publication No. 2001-297481 proposes a method with a relationship (Pe/Pw)ref>(Pe/Pw)H>(Pe/Pw)L for power ratios (Pe/Pw)L, (Pe/Pw)ref and (Pe/Pw)H at low linear velocity, medium linear velocity and high linear velocity, respectively. The inventors of the present invention, however, found this method cannot provide acceptable overwrite characteristics for several times of overwriting because of low erasing power at low linear velocity.

As discussed above, the conventional optical recording methods with lower reflectivity of un-recorded sections than that of the sections after recorded or erased and the conventional optical storage media that exhibit low reflectivity on un-recorded sections after initialized cannot provide sufficient jitter characteristics after overwriting in high linear-velocity recording, thus having difficultly in providing acceptable overwrite characteristics.

The conventional recording methods applicable to multispeed recording for optical storage media provide higher power ratio for higher recording linear velocity, the maximum power ratio at a medium linear velocity whereas the minimum power ratio at a low linear velocity or a constant erasing power at all linear velocities. These methods, however, cannot offer sufficient initial recording characteristics or overwrite characteristics because of large erasing power Peh at high linear velocity or cannot offer sufficient overwrite characteristics because of small erasing power Pel at low linear velocity.

SUMMARY OF THE INVENTION

A purpose of the present invention is to provide an optical recording method, an optical recording apparatus and an optical storage medium that offer excellent overwrite characteristics in high linear-velocity (high×speed) optical recording to rewritable phase-change optical storage media, such as, optical disks and optical cards.

Another purpose of the present invention is to provide an optical recording method, an optical recording apparatus and an optical storage medium that offer excellent overwrite characteristics in optical recording at any linear velocity selected among a plurality of linear velocities over a range from low linear velocity (low×speed) to high linear velocity (high×speed).

The present invention provides an optical recording method of recording information to be recorded in a recording layer of a phase-change optical storage medium, the method comprising the steps of: a modulation step of modulating the information to be recorded to generate modulated data; a mark-length generation step of generating desired mark-length data based on the modulated data; and a recording step of generating a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiating a recording light beam onto the recording layer in accordance with the recording pulse pattern to record at least one recorded mark representing the information to be recorded, wherein the recording step uses an optimum erasing power, as the erasing power, the optimum erasing power satisfying an expression (1): $1.000<(R1/R0)<1.030$ . . . (1) in which R0 is a reflectivity exhibited by an un-recorded section of the recording layer, on which no data has ever been recorded, when irradiated with a reproducing light beam, and R1 is a reflectivity exhibited by the un-recorded section when irradiated with the reproducing light beam after irradiated once with a beam having the erasing power.

Moreover, the present invention provides an optical recording apparatus for recording information to be recorded in a recording layer of a phase-change optical storage medium, comprising: an encoder to modulate the information to be recorded to generate modulated data; a mark-length generator to generate desired mark-length data based on the modulated data; and a recorder to generate a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiate a recording light beam onto the recording layer in accordance with the recording pulse pattern to record at least one recorded mark representing the information to be recorded, wherein the recorder uses an optimum erasing power, as the erasing power, the optimum erasing power satisfying an expression (1): $1.000<(R1/R0)<1.030$ . . . (1) in which R0 is a reflectivity exhibited by an un-recorded section of the recording layer, on which no data has ever been recorded, when irradiated with a reproducing light beam, and R1 is a reflectivity exhibited by the un-recorded section when irradiated with the reproducing light beam after irradiated once with a light beam having the erasing power.

Furthermore, the present invention provides a phase-change optical storage medium comprising: a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power, wherein the recording layer has been initialized with an initialization laser beam having the erasing power satisfying expressions (1) and (2): $1.000<(R1/R0)<1.030$ . . . (1), $0.030<(R10/R0)-(R1/R0)<0.150$ . . . (2) in which R0 is a reflectivity exhibited by an un-recorded section of the recording layer, on which no data has ever been recorded, when irradiated with a reproducing light beam, R1 is a reflectivity exhibited by the un-recorded section when irradiated with the reproducing light beam after irradiated once with a light beam having the erasing power, and R10 is a reflectivity exhibited by the un-recorded section when irradiated with the reproducing light beam after irradiated ten times with a light beam having the erasing power.

Moreover, the present invention provides an optical recording method of recording information to be recorded in a recording layer of a phase-change optical storage medium, the method comprising the steps of: a modulation step of modulating the information to be recorded to generate modulated data; a mark-length generation step of generating desired mark-length data based on the modulated data; and a recording step of generating a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiating a recording light beam onto the recording layer in accordance with the recording pulse pattern to record at least one recorded mark representing the information to be recorded, wherein the recording step performs recording at a recording linear velocity selected from among a first recording linear velocity Vl, a second recording linear velocity Vm, and a third recording linear velocity Vh (Vl<Vm<Vh), to the recording layer, and in the recording step, recording at the first recording linear velocity Vl, recording at the second recording linear velocity Vm, and recording at the third recording linear velocity Vh satisfy a relationship indicated by an expression (1): $\epsilon h<\epsilon m<\epsilon l$ . . . (1) in which $\epsilon l$ is a first power ratio obtained by dividing a first erasing power Pel by a first recording power Pwl at the first recording linear velocity Vl, $\epsilon m$ is a second power ratio obtained by dividing a second erasing power Pem by a second recording power Pwm at the second recording linear velocity Vm, and $\epsilon h$ is a third power ratio obtained by dividing a third erasing power Peh by a third recording power Pwh at the third recording linear velocity Vh.

Furthermore, the present invention provides an optical recording apparatus for recording information to be recorded in a recording layer of a phase-change optical storage medium, comprising: an encoder to modulate the information to be recorded to generate modulated data; a mark-length generator to generate desired mark-length data based on the modulated data; and a recorder to generate a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiate a recording light beam onto the recording layer in accordance with the recording pulse pattern to record at least one recorded mark representing the information to be recorded, wherein the recorder performs recording at a recording linear velocity selected from among a first recording linear velocity Vl, a second recording linear velocity Vm, and a third recording linear velocity Vh (Vl<Vm<Vh), to the recording layer, and recording at the first recording linear velocity Vl, recording at the second recording linear velocity Vm, and recording at the third recording linear velocity Vh performed by the recorder satisfy a relationship indicated by an expression (1): $\epsilon h<\epsilon m<\epsilon l$ . . . (1) in which $\epsilon l$ is a first power ratio obtained by dividing a first erasing power Pel by a first recording power Pwl at the first recording linear velocity Vl, $\epsilon m$ is a second power ratio obtained by dividing a second erasing power Pem by a second recording power Pwm at the second recording linear velocity Vm, and ϵh is a third power ratio obtained by dividing a third erasing power Peh by a third recording power Pwh at the third recording linear velocity Vh.

Moreover, the present invention provides a phase-change optical storage medium comprising: a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power, wherein written in a specific area of the recording layer is identification information that indicates a recording power and an erasing power peculiar to each of a first recording linear velocity Vl, a second recording linear velocity Vm, and a third recording linear velocity Vh (Vl<Vm<Vh), in the identification information, a first power ratio ϵl obtained by dividing a first erasing power Pel by a first recording power Pwl at the first recording linear velocity Vl, a second power ratio ϵm obtained by dividing a second erasing power Pem by a second recording power Pwm at the second recording linear velocity Vm, and a third power ratio ϵh obtained by dividing a third erasing power Peh by a third recording power Pwh at the third recording linear velocity Vh satisfy a relationship indicated by an expression (1): ϵh<ϵm<ϵl ... (1).

BRIEF DESCRIPTION OF DRAWINGS

FIG. 17 is a view showing recording characteristics in embodiment samples A-1 to A-3 and comparatives samples A-4 to A-6;

FIG. 18 is a view showing recording characteristics in embodiment samples B-1 to B-5 and comparatives samples B-6 to B-8;

FIG. 19 is a view showing recording characteristics in embodiment samples C-1 to C-3 and comparatives samples C-4 and C-5;

FIG. 20 is a view showing recording characteristics in embodiment samples D-1 to D-3 and comparatives samples D-4 to D-8;

FIG. 21 is a view showing recording characteristics in embodiment samples E-1 to E-3 and comparatives samples E-4 to E-8;

FIG. 22 is a view showing recording characteristics in embodiment samples F-1 to F-5 and comparatives samples F-6 to F-11;

FIG. 23 is a view showing recording characteristics in embodiment samples G-1 to G-5 and comparatives samples G-6 to G-11;

FIG. 24 is a view showing recording characteristics in embodiment samples H-1 and H-2 and comparatives samples H-3 to H-5; and FIG. 25 is a view showing recording characteristics in embodiment samples I-1 and I-2 and comparatives samples I-3 to I-5.

DETAILED DESCRIPTION OF PREFERRED EMBODIMENTS

Figure 1:
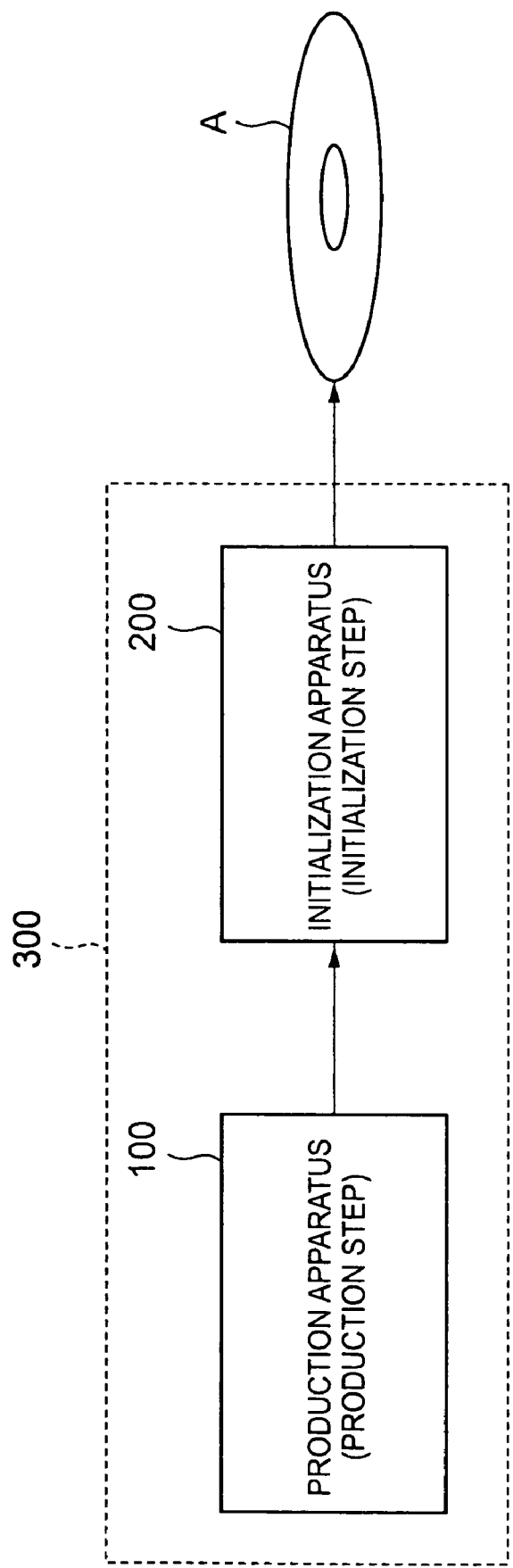
FIG. 1 is a view illustrating a production system 300 for phase-change optical storage media or production and initialization steps performed at the production system 300.

FIG. 1 is a view illustrating a production system 300 for producing phase-change optical storage media or production and initialization steps performed at the production system 300. A production apparatus (production step) 100 produces phase-change optical storage media and an initialization apparatus (initialization step) 200 initializes the phase-change optical storage media. Each phase-change optical storage medium subjected to the initialization process is shipped as an optical storage medium A.

Representative of phase-change optical storage media are phase-change optical disks such as DVD-RW, media capable of repeatedly overwriting data such as optical cards, and so on. A phase-change optical disk (an optical storage medium A) is described in the following description as an embodiment of a phase-change optical storage medium. It will, however, be appreciated that the present invention is applicable to other types of phase-change optical storage media such as optical cards.

[Structure of Optical Storage Medium]

Figure 2:
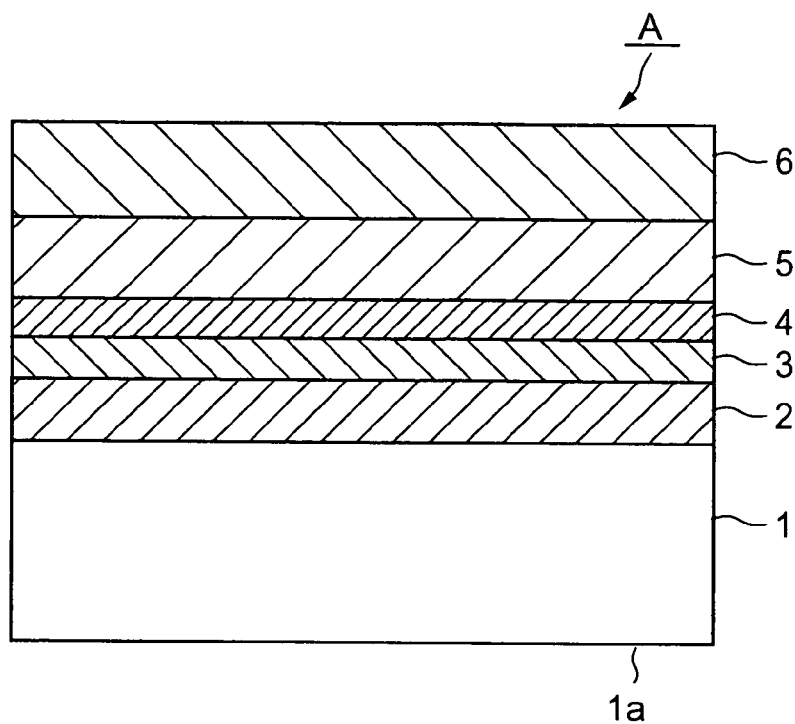
FIG. 2 is an enlarged cross section illustrating an embodiment of an optical storage medium according to the present invention.

FIG. 2 is an enlarged cross section illustrating an optical storage medium A, an embodiment of the present invention. The optical storage medium A has a structure in which a first protective layer 2, a recording layer 3, a second protective layer 4, a reflective layer 5, and a third protective layer 6 are laminated in order on a substrate 1 having a bottom surface that is an incident plane 1a on which a recording or reproducing laser beam, or an erasing laser beam is incident. The third protective layer 6 is provided according to necessity, as described later.

Suitable materials for the substrate 1 are several types of transparent synthetic resins, a transparent glass, and so on. The transparent substrate 1 is used for protection against dust, damage, etc. A focused laser beam reaches the recording layer 3 through the incident plane 1a of the substrate 1 in data recording. Suitable materials for the substrate 1 in such-use are, for example, glass, polycarbonate, polymethylmethacrylate, polyolefin resin, epoxy resin, or polyimide resin. Most suitable material is polycarbonate resin for low birefringence and hygroscopicity, and also easiness to process.

Although not limited, in compatibility with DVD, the thickness of the substrate 1 is preferably in the range from 0.01 mm to 0.6 mm, particularly, 0.6 mm (for the total DVD thickness of 1.2 mm). This is because dust easily affect recording with a focused laser beam through the incident plane 1a of the substrate 1 when the thickness of the substrate 1 is less than 0.01 mm. A practical thickness for the substrate 1 is in the range from 0.01 mm to 5 mm if there is no particular requirement for the total thickness of the optical storage medium. The thickness of the substrate 1 over 5 mm causes difficulty in increase in objective-lens numerical aperture, which leads to larger laser spot size, hence resulting in difficulty in increase in storage density.

The substrate 1 may be flexible or rigid. A flexible substrate 1 is used for tape-, sheet- or card-type optical storage media whereas a rigid substrate 1 for card- or disk-type optical storage media.

The first and second protective layers 2 and 4 protect the substrate 1 and the recording layer 3 against heat which may otherwise cause inferior recording characteristics and also against optical interference which may otherwise cause low signal contrast in reproduction.

The material for each of the first and second protective layers 2 and 4 allows a laser beam to pass therethrough in recording, reproduction or erasing and exhibits a refractive index "n", preferably, in the range of $1.9 \leq n \leq 2.3$. A suitable material for each of the first and second protective layers 2 and 4 is a material that exhibits high thermal characteristics, for example, an oxide such as $SiO_2$, SiO, ZnO, $TiO_2$, $Ta_2O_5$, $Nb_2O_5$, $ZrO_2$ or MgO, a sulfide such as ZnS, $In_2S_3$ or $TaS_4$, or carbide such as SiC, TaC, WC or TiC, or a mixture of these materials. Among them, a mixture of ZnS and $SiO_2$ is the best for high recording sensitivity, C/N and erasing rate against repeated recording, reproduction or erasure.

The first and second protective layers 2 and 4 may or may not be made of the same material or composition.

The thickness of the first protective layer 2 is in the range from about 5 nm to 500 nm, preferably, 20 nm to 300 nm so that it cannot be easily peeled off from the substrate 1 or the recording layer 3 and is not prone to damage such as cracks. The thickness below 20 nm hardly offers high disk optical characteristics whereas over 300 nm causes lower productivity. A more acceptable range is from 30 nm to 80 nm.

The thickness of the second protective layer 4 is, preferably, in the range from 5 nm to 40 nm for high recording characteristics such as C/N and erasing rate, and also high stability in a number of repeated overwriting. The thickness below 5 nm hardly gives enough heat to the recording layer 3, resulting in increase in optimum recording power, whereas over 40 nm causes inferior overwrite characteristics. A more acceptable range is from 8 nm to 20 nm.

The recording layer 3 is a layer of an alloy such as Ag—In—Sb—Te or Ge—In—Sb—Te, or of Ge—In—Sb—Te added with at least any one of Ag, Si, Al, Ti, Bi and Ga. A preferable thickness range for the recording layer 3 is from 10 nm to 25 nm. The thickness below 10 nm lowers crystallization rate which causes inferior characteristics in high-speed recording whereas over 25 nm requires larger recording laser power.

An interface layer may be provided on either or each surface of the recording layer 3. One requirement for the interface layer is that it is made of a material without including a sulfide. An interface layer made of a material including a sulfide causes diffusion of the sulfide into the recording layer 3 due to repeated overwriting, which could lead to inferior recording characteristics, and also inferior erasing characteristics.

An acceptable material for the interface layer includes at least any one of a nitride, an oxide and a carbide, specifically, germanium nitride, silicon nitride, aluminum nitride, aluminum oxide, zirconium oxide, chromium oxide, silicon carbide and carbon. Oxygen, nitrogen or hydrogen may be added to the material of the interface layer. The nitride, oxide and carbide listed above may not be stoichiometric compositions for such an interface layer. In other words, nitrogen, oxygen or carbon may be excessive or insufficient, which could offer high performance, such as high durability in that the interface layer is hardly peeled off.

Preferable materials for the reflective layer 5 are a metal, such as Al, Au or Ag, an alloy of any of these metals as a major component with at least one type of metal or semiconductor, and a mixture of a metal, such as Al, Au or Ag, and a metal nitride, a metal oxide or a metal chalcogen of Al, Si, etc.

Most preferable among them is a metal, such as Al, Au or Ag, or an alloy of any of these metals as a major component, for high reflectivity and thermal conductivity. A typical alloy is made of Al and at least one of the following elements: Si, Mg, Cu, Pd, Ti, Cr, Hf, Ta, Nb, Mn, Zr, etc., or Au or Ag and at least one of the following elements: Cr, Ag, Cu, Pd, Pt, Ni, Nd, In, Ca, etc. For high linear velocity recording, the most preferable one is a metal or an alloy having Ag exhibiting extremely high thermal conductivity as a major component, in view of recording characteristics.

Any layer that touches the reflective layer 5 is preferably made of a material without sulfur when the reflective layer 5 is made of pure silver or an alloy of silver, to restrict generation of a compound of AgS.

The thickness of the reflective layer 5 is, preferably, in the range from 50 nm to 300 nm, which depends on the thermal conductivity of a material used for this layer. The reflective layer 5 of 50 nm or more in thickness is optically stable in, particularly, reflectivity. Nevertheless, a thicker reflective layer 5 affects a cooling rate. Thickness over 300 nm requires a longer production time. A material exhibiting a high thermal conductivity allows the reflective layer 5 to have a thickness in an optimum range such as mentioned above.

A diffusion prevention layer (not shown) is, preferably, provided between the second protective layer 4 and the reflective layer 5 when the layer 4 is made of a compound of ZnS and $SiO_2$ and the layer 5 is made of Ag or an alloy of Ag, to restrict decrease in reflectivity due to generation of a compound of AgS because of chemical reaction between S of the layer 4 and Ag of the layer 5.

One requirement for the material of the diffusion prevention layer is that it is made of a material without sulfur, like the interface layer described above. Specific materials for the diffusion prevention layer are the same as those for the interface layer.

[Optical Storage Medium Production Method]

Disclosed next is a method of producing an optical storage medium at the production apparatus 100.

Lamination of the first protective layer 2, the recording layer 3, the second protective layer 4, the reflective layer 5, etc., on the substrate 1 is achieved by any known vacuum thin-film forming technique, such as, vacuum deposition (with resistive heating or electron bombardment), ion plating, (D.C., A.C. or reactive) sputtering. The most feasible among the techniques is sputtering for easiness of composition and film-thickness control.

A film-forming system feasible in this method is a batch system in which a plural number of substrates 1 are simultaneously subjected to a film forming process in a vacuum chamber or a single-wafer system in which substrates 1 are processed one by one. The thickness of the first protective layer 2, the recording layer 3, the second protective layer 4, the reflective layer 5, etc., can be adjusted with control of power to be supplied and its duration in sputtering or monitoring conditions of deposited layers with a crystal oscillator.

The first protective layer 2, the recording layer 3, the second protective layer 4, the reflective layer 5, etc., can be formed while each substrate 1 is being stationary, transferred or rotating. Rotation of the substrate (and further with orbital motion) is most feasible for higher uniformity. An optional cooling process minimizes warpage of the substrate 1.

A dielectric layer of ZnS, $SiO_2$, etc., or a resin protective layer made of, for example, an ultraviolet-cured resin may be provided as the third protective layer 6 according to necessity, after the reflective layer 5, etc., are formed, to protect those layers already formed against deformation, in the extent which does not make the present invention extremely less advantageous.

Two substrates 1 having the same layers may be prepared and bonded to each other, for example by an adhesive, as a double-sided optical storage medium.

Disclosed next is a method of initializing an optical storage medium at the initialization apparatus 200.

As already disclosed, the optical storage medium A is shipped after subjected to the initialization step at the initialization apparatus 200. Initialization is a process of radiating a laser beam or light of a xenon flash lamp onto the recording layer 3 so that the layer 3 is heated and thus crystallized. Initialization with a laser beam is a better choice for less noise in reproduction.

One of the features of this embodiment lies in initialization requirements (scanning linear velocity and power of an initialization laser beam) in producing the optical storage medium A, which will be discussed later.

Figure 3:
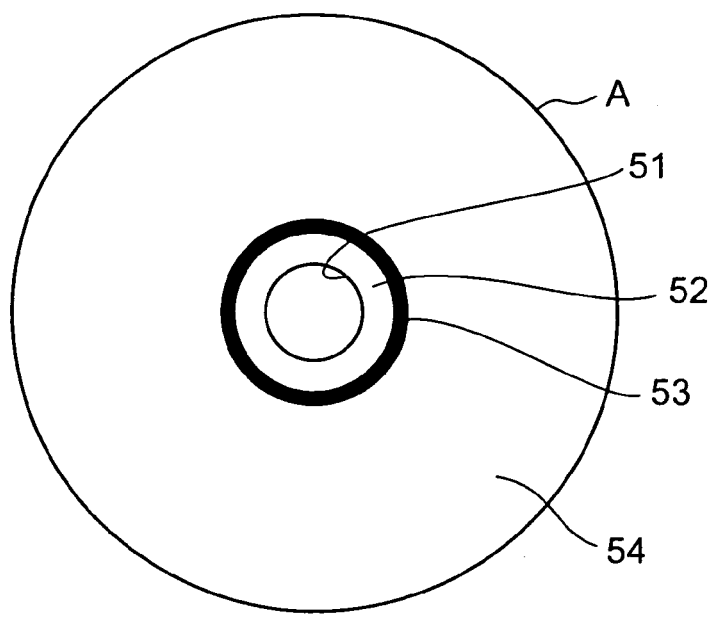
FIG. 3 is a plan view illustrating an embodiment of an optical storage medium according to the present invention.

FIG. 3 is a plan view illustrating the optical storage medium A. The optical storage medium A has a center hole 51 and a clamp area 52 therearound. Provided concentrically around the clamp area 52 is a data area (read-in area) 53 provided around which is a recording area 54 that stores actual data such as video data and audio data. The read-in area 53 may be in a condition like ROM (Read Only Memory) or RAM (Random Access Memory). Alternatively, a high-frequency wobble or bits can be formed in a laser guide groove for gaining a tracking signal, as read-only recorded data.

Recorded in the read-in area 53, as identification data, are recording requirements for the optical storage medium A so that it can store data with excellent characteristics. The identification data includes recording requirements that, for example, indicate laser strength of a laser beam used in formation of recorded marks, which will be disclosed later, or the relationships such as indicated by expressions (4), (5) and (6), which will be disclosed later.

[Recording Method to Optical Storage Medium]

Figure 4:
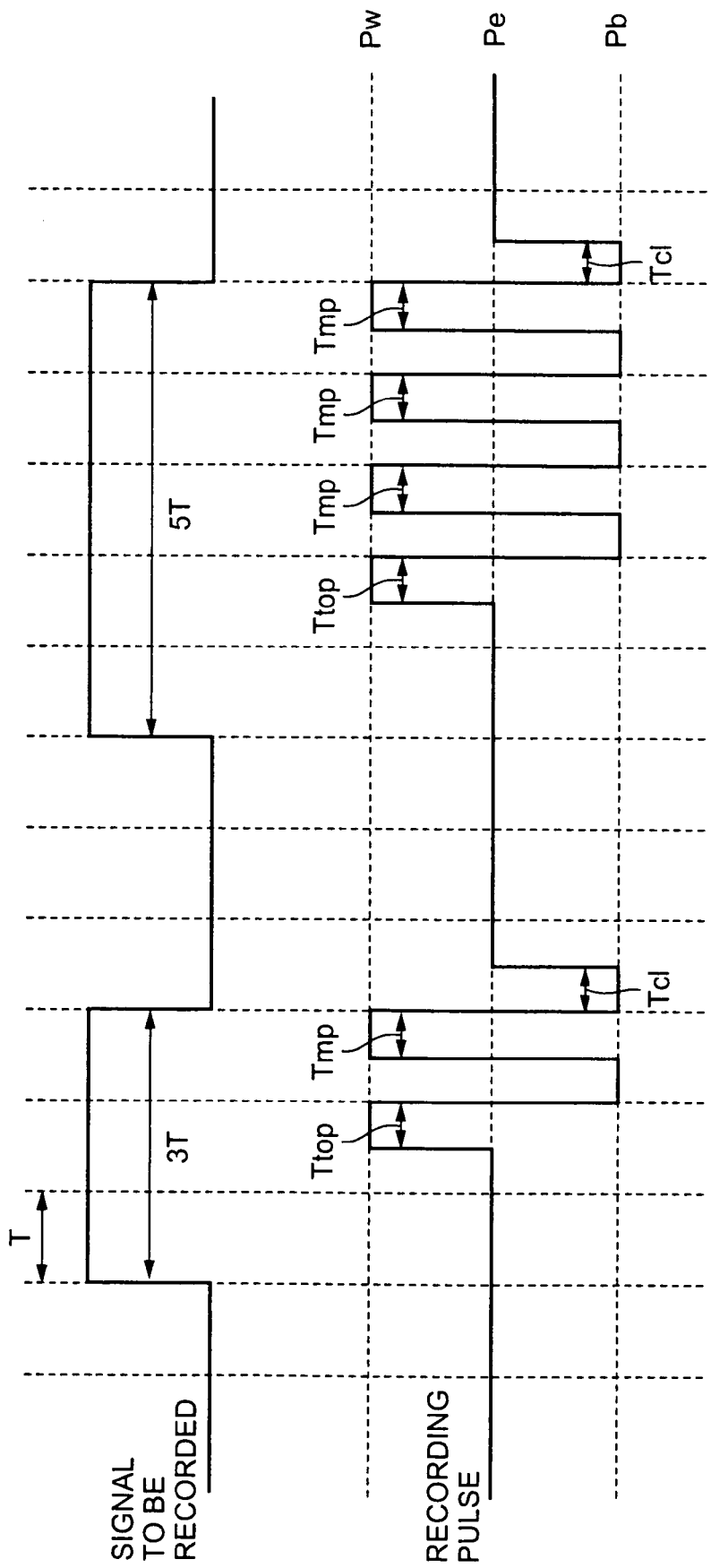
FIG. 4 is a view illustrating a first example of a recording pulse pattern.

FIG. 4 illustrates a recording pulse pattern to be used in recording data on the optical storage medium A. A laser beam is modulated with laser strength at three levels (a recording power Pw, an erasing power Pe and a bottom power Pb) based on the recording pulse pattern, with increase or decrease in the number of pulses in accordance with a mark length carried by a signal to be recorded, to form recorded marks having a given mark length on the recording layer 3. In terms of laser strength, the recording power Pw is the largest, the erasing power Pe the smaller, and the bottom power Pb the smallest.

As illustrated in FIG. 4, the recording pulse pattern consists of a top pulse Ttop that rises from the erasing power Pe for initially applying a laser beam onto the recording layer 3 with the recording power Pw, multipulses Tmp, that follows the top pulse Ttop, for alternatively applying the recording power Pw and the bottom power Pb, and an erasing pulse Tcl, located at the end of the pattern, that rises from the bottom power Pb in application of a laser beam with the erasing power Pe. The top pulse Ttop and the multipulses Tmp constitute a recording pulse for recording a recorded mark on the recording layer 3. A recording pulse may be formed only with the top pulse Ttop with no multipulses Tmp.

For example, in DVD-RW, there are ten types of mark length, that is, 3T, 4T, 5T, 6T, 7T, 8T, 9T, 10T, 11T, and 14T. In general, the number of the multipulses Tmp is (n-1) or (n-2) when a mark length is expressed as nT. FIG. 4 indicates (n-2) for the multipulses. Here, T indicates a unit clock, 1T=38.2 ns at DVD×1 speed (recording linear velocity: 3.5 m/s), 1T=9.6 ns at DVD×4 speed (recording linear velocity: 14.0 m/s) for DVD-RW.

Figure 5:
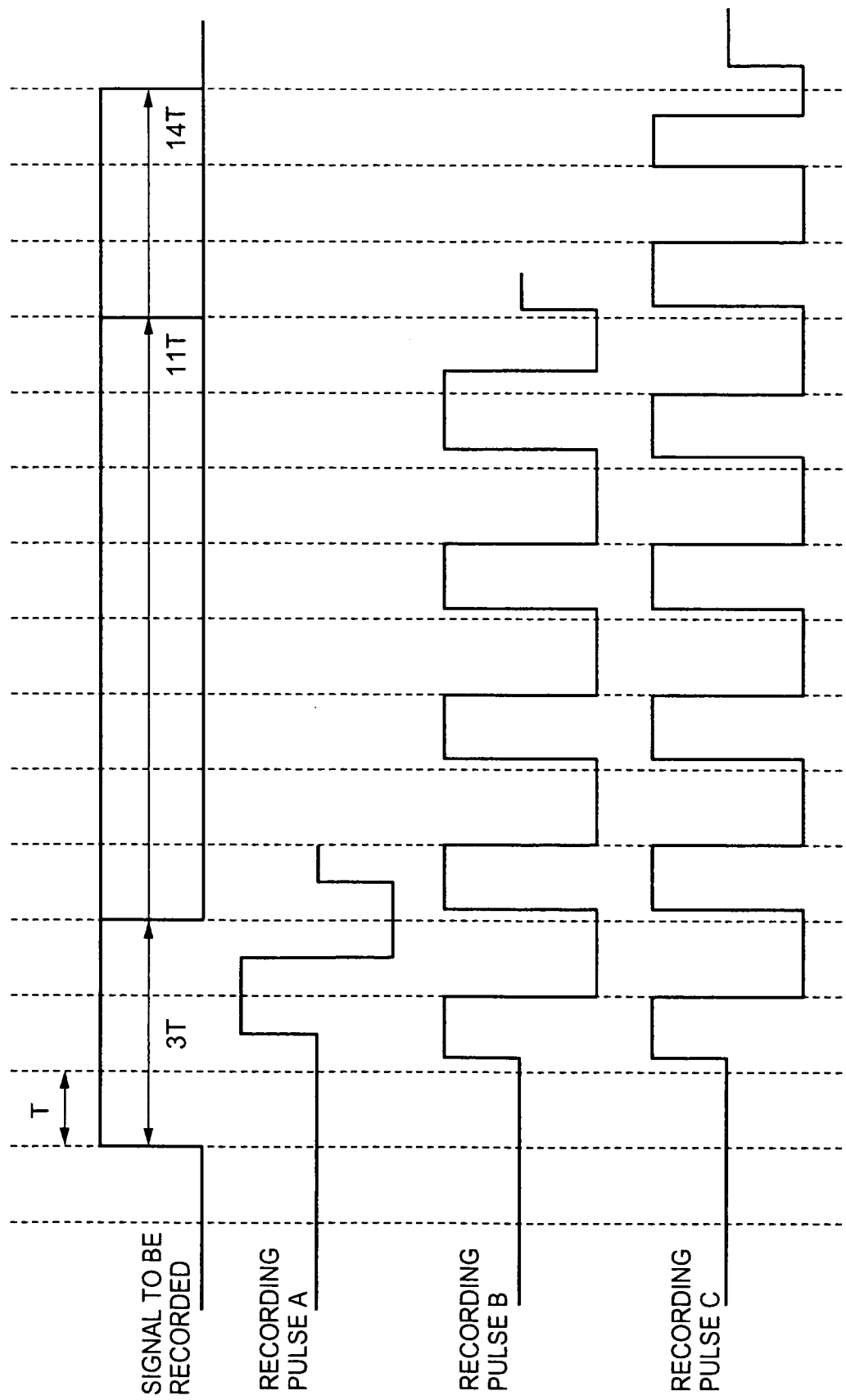
FIG. 5 is a view illustrating a second example of a recording pulse pattern.

A 2T-based recording pulse pattern such as shown in FIG. 5 is applicable to recent high-speed recording with a short unit clock in the order of several nanoseconds, in view of the limit of response of laser pulses in raising and falling. In FIG. 5, recording pulses A, B and C have recording pulse patterns for recording recorded marks having mark lengths of 3T, 11T and 14T, respectively.

[Optical Recording Apparatus]

Figure 6:
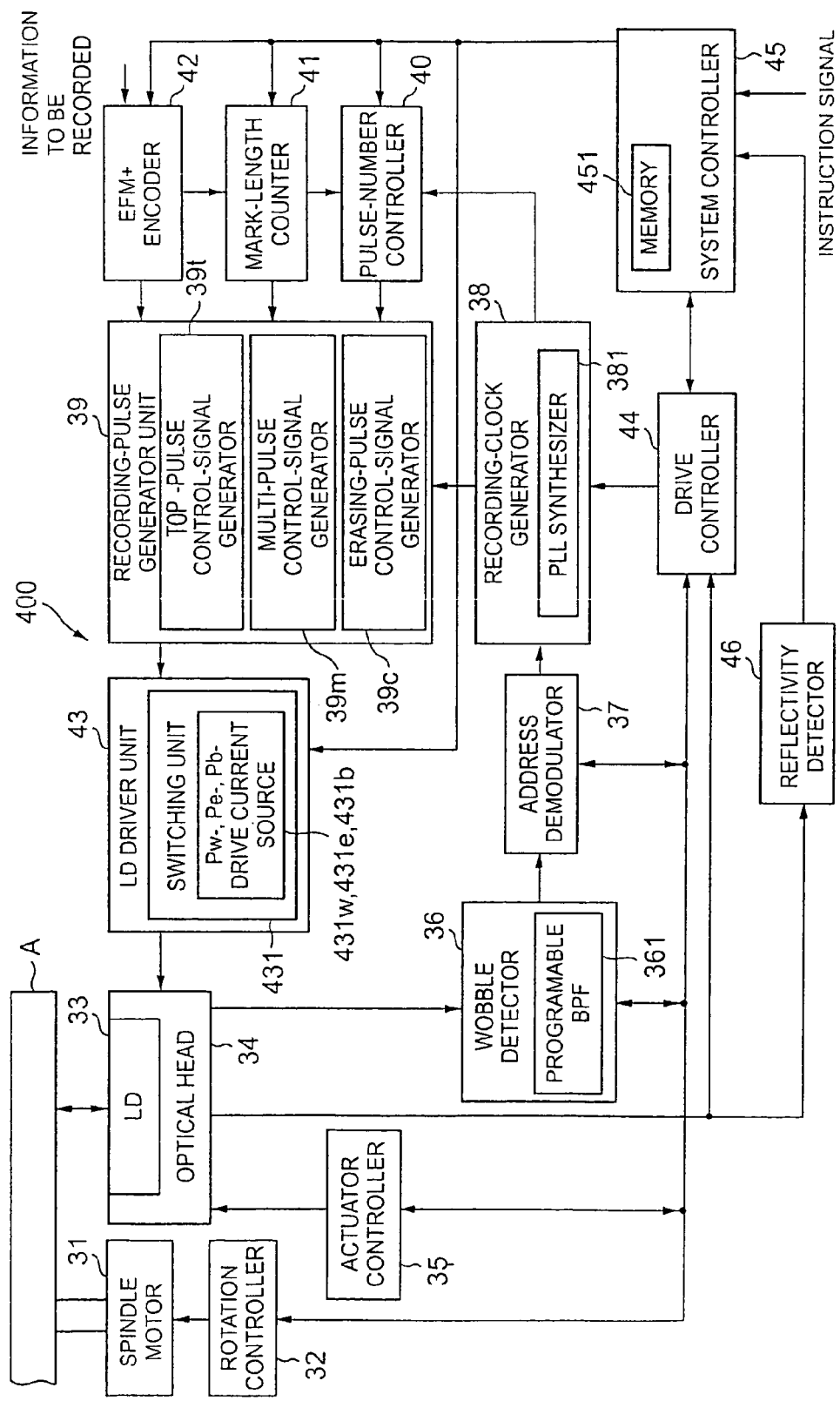
FIG. 6 is a block diagram of an embodiment of an optical recording apparatus according to the present invention.

FIG. 6 shows an embodiment of an optical recording apparatus according to the present invention, for irradiating a laser beam having a given recording pulse pattern onto the optical storage medium A.

The optical storage medium A is rotated by a spindle motor 31. The spindle motor 31 is controlled by a rotation controller 32 so that its rotating speed reaches a recording linear velocity corresponding to a target recording speed. Provided as movable in the radius direction of the optical storage medium A is an optical head 34 equipped with a semiconductor laser (LD) 33 for use in recording, reproduction or erasing to the optical storage medium A, an objective lens (not shown) for focusing an irradiated laser beam of the LD 33, and a 4-segment (for example) photoreceptor (not shown).

A recommendable light source for recording in the optical recording apparatus of this embodiment is a high-intensity light source of a laser beam or strobe light, for example. Most recommendable is a semiconductor laser for compactness, low power consumption and easiness in modulation.

The quadrant photo-detector of the optical head 34 receives a reflected light beam of a laser beam irradiated onto the optical storage medium A from the LD 33. The quadrant photo-detector generates a push-pull signal based on the received light and outputs it to a wobble detector 36. It also outputs a focus error signal and a tracking error signal to a drive controller 44 based on the received light beam. A reproduced signal that is a composite signal of the quadrant photo-detector is output to a reflectivity detector 46.

The drive controller 44 controls an actuator controller 35 based on the supplied focus and tracking error signals. The actuator controller 35 controls the optical head 34 in focusing and tracking to the optical storage medium A.

The reflectivity detector 46 detects a reflectivity based on the supplied signal thus reproduced and outputs a detected result to a system controller 45. The system controller 45 controls a Pe-drive current source 431e based on the reflectivity, as disclosed later, when no identification data indicating an optimum erasing power Pe is prestored in a memory 451.

The wobble detector 36, equipped with a programmable band-pass filter (BPF) 361, outputs a detected wobble signal to an address demodulator 37. The address demodulator 37 demodulates and outputs an address from the detected wobble signal. The demodulated address is input to a recording-clock generator 38, equipped with a PLL synthesizer 381, which generates a recording-channel clock and outputs it to a recording-pulse generator unit 39 and a pulse-number controller 40.

The recording-clock generator 38 is controlled by the drive controller 44. Also controlled by the drive controller 44 are the rotation controller 32, the actuator controller 35, the wobble detector 36, the address demodulator 37, and the system controller 45.

The drive controller 44 outputs the wobble signal supplied from the wobble detector 36 to the recording-clock generator 38, and also the address data supplied from the address demodulator 37 to the system controller 45.

The system controller 45, having the memory 451, controls an EFM+encoder 42, a mark-length counter 41, the pulse-number controller 40, and an LD driver unit 43. The EFM+encoder 42 modulates input information to be recorded into modulated data with 8-16 modulation and outputs it to the recording-pulse generator unit 39 and the mark-length counter 41. The mark-length counter 41 works as a mark-length generator that counts intervals of inversion of the modulated data to generate mark-length data, the counted value being output to the recording-pulse generator unit 39 and the pulse-number controller 40. The pulse-number controller 40 controls the recording-pulse generator unit 39 to generate specific recording pulses based on the supplied counted value and recording-channel clock.

The recording-pulse generator unit 39 is equipped with a top-pulse control-signal generator 39t, a multipulse control-signal generator 39m, and an erasing-pulse control-signal generator 39c. The top-pulse control-signal generator 39t, the multipulse control-signal generator 39m, and the erasing-pulse control-signal generator 39c generate a top-pulse control signal, a multipulse control signal, and an erasing-pulse control signal, respectively. Each control signal is supplied to the LD driver unit 43. A switching unit 431 switches a drive current source 431w for recording power Pw, the drive current source 431e for erasing power Pe, and a drive current source 431b for bottom power Pb based on the supplied control signals, thus generating a recording pulse pattern.

The Pw-drive current source 431w, the Pe-drive current source 431e, and the Pb-drive current source 431b supply currents to the optical head 34 based on a recording powers Pw, an erasing powers Pe and a bottom power Pb prestored in the memory 451 of the system controller 45. These three values are optimum values for offering the optical storage medium A excellent recording characteristics. Identification data that indicates these three values may be prestored in the memory 451, updated or stored with the help of the reflectivity detector 46. The memory 451 is either a ROM (Read Only Memory) or a recordable RAM (Random Access Memory), for example.

The optical recording apparatus in this embodiment can set any recording linear velocity selected among a plurality of recording linear velocities for higher linear velocity (x speed) in optical storage media. On receiving an instruction signal for selecting a recording linear velocity (x speed mode), the system controller 45 controls the Pw-drive current source 431w, the Pe-drive current source 431e, and the Pb-drive current source 431b, as disclosed above, based on the identification data on an instructed recording linear velocity and prestored in the memory 451. Identification data at a plurality of recording linear velocities are prestored in the memory 451, as disclosed above.

Also prestored in the memory 451 are identification data indicated by the expressions (4), (5) and (6), which will be disclosed later.

A generated recording pulse pattern is input to the optical head 34. The optical head 34 controls the LD 33 to output LD-emission waveforms with a desired recording pulse pattern and power ratio $\epsilon$ (Pw/Pe), thus recording information to be recorded on the optical storage medium A.

The recording-pulse generator unit 39, the LD driver unit 43, and the optical head 34 work together as a recording unit 400 that generates a recording pulse pattern of recording pulses rising from an erasing power Pe and formed between a recording power Pw larger than the erasing power Pe and a bottom power Pb smaller than the erasing power Pe and of erasing pulses rising from the bottom power Pb to the erasing power Pe, based on the mark-length data generated by the mark-length counter 41, and irradiates a recording beam onto the recording layer 3 of the optical storage medium A through the LD 33 in accordance with the recording pulse pattern, thus recording recorded marks indicating the information to be recorded.

[Study of Optimum Erasing Power]

The inventors of the present invention presupposed that the erasing power Pe could affect recording and overwrite characteristics of optical storage media, and found out that the presumption is correct and determined the optimum erasing power that gives excellent recording and overwrite characteristics, based on the following embodiment samples A-1 to A-3 and comparative samples A-4 to A-6.

Each of the following embodiment and comparative sample was subjected to recording (1-beam overwriting) and reproduction with an optical-disk drive tester (DDU1000) equipped with a 658 nm-wavelength laser diode and an optical lens (NA=0.60) made by Pulstec. Co.

Recording and reproduction were evaluated with an 8-16 (EFM+) modulation random pattern for a signal to be recoded. Recording were conducted in the same density as DVD-ROM, with a bit length of 0.267 µm/bit, the capacity corresponding to 4.7 gigabytes. Recording of 10-time overwriting were conducted to a target track and adjacent tracks, followed by slicing at the amplitude center of each reproduced signal for measurements of clock to data jitters. The laser power Pr of each reproducing beam was constant at 0.7 mW.

A multiple pulse sequence defined in the DVD-RW version 1.1, such as shown in FIG. 4, was used as the recording strategy.

Embodiment Sample A-1

Several layers which will be disclosed later, were formed on a on a substrate 1 made of a polycarbonate resin with 120 mm in diameter and 0.6 mm in thickness. Grooves were formed on the substrate 1 at 0. 74 µm in track pitch, with 25 nm in groove depth and about 40:60 in width ratio of groove to land. The grooves stuck out when viewed from an incident direction of a laser beam in recording, reproduction or erasure.

After a vacuum chamber was exhausted up to $3\times10^{-4}$ Pa, a 70 nm-thick first protective layer 2 was formed on the substrate 1 by high-frequency magnetron sputtering with a target of ZnS added with 20-mol % $SiO_2$ at $2\times10^{-1}$ Pa in Ar-gas atmosphere.

Formed on the first protective layer 2, in order, were a 16 nm-thick recording layer 3 with a target of an alloy of 4 elements Ge—In—Sb—Te, a 16 nm-thick second protective layer 4 of the same material as the first protective layer 2, and a 120 nm-thick reflective layer 5 with a target of Ag—Pd—Cu.

The substrate 1 was taken out from the vacuum chamber. The reflective layer 5 was spin-coated with an acrylic ultraviolet-cured resin (SK5110 made by Sony Chemicals. Co.). The resin was cured with radiation of ultraviolet rays so that a 3 µm-thick third protective layer 6 was formed on the reflective layer 5, thus an optical storage medium A, such as shown in FIG. 2, was produced.

The recording layer 3 was initialized by the initialization apparatus 200 (POP120 made by Hitachi Computer Peripherals, Co.) with a laser beam having 250 µm in beam width in radial direction and 1.0 µm in beam width in scanning direction, at 4.5 m/s in scanning linear velocity, 1600 mW in laser power and 220 µm in scanning pitch.

Obtained next were reflectivities R0 and R1. The reflectivity R0 is a reflectivity exhibited by an un-recorded section of the recording area 54 of the optical storage medium A, on which no data has ever been recorded, when irradiated with a reproducing beam (0.7 mW) having a laser power Pr from the LD 33. The reflectivity R1 is a reflectivity exhibited by the un-recorded section when irradiated with a reproducing laser beam from the LD 33 after irradiated once with a laser beam having an erasing power Pe.

Recording was then conducted to the optical storage medium A from the incident plane 1a of the substrate 1 to the grooves of the recording layer 3.

The recording requirements for the recording pulse pattern were Ttop=0.6 [T], Tmp=0.5 [T], and Tcl=0.0 [T] at a linear velocity of 14 m/s (DVD×4 speed), with three levels in strength of laser beams: a recording power Pw=17.0 [mW], an erasing power Pe=4.6 [mW] and, a bottom power Pb=0.5 [mW].

The embodiment sample A-1 of the optical storage medium A exhibited 17.4 in R0, and 17.7 in R1 after irradiated once with a laser beam having the erasing power Pe=4.6 [mW] (R1/R0=1.017). All the measured values for the embodiment sample A-1 are shown in FIG. 17 (EMBODIMENT SAMPLE A-1).

Initial characteristics and overwrite recording characteristics were as shown in FIG. 17: 6.5% in initial-recording (DOW 0) jitter, 8.0% in 1-time overwrite (DOW 1) jitter, and 7.5% in 9-time overwrite (DOW 9) jitter. Moreover, although not shown, jitter in about 10,000-time overwrite (DOW 10000) was 8.5%. Thus, The embodiment sample A-1 was always stable in characteristics after overwriting, with excellent recording characteristics.

Overwriting is 1-beam overwriting for erasing a recorded mark already formed and forming a new recorded mark with one-time laser scanning, in the disclosure. Also defined in the disclosure are: DOW 0 (Direct Over Write, referred to as overwriting in the disclosure); initial recording for forming a recorded mark on an un-recorded section of an initialized optical storage medium A; and DOW 1; 1-th overwriting for forming another recorded mark on the initially recorded section. Defined further in the disclosure are: "excellent" in jitter of 10% or less which is judged as giving less adverse effects to error rate; and "excellent DOW-jitter characteristics" for jitter of 10% or less over the range from DOW 0 to DOW 10000 (from initial recording to 10,000-th overwriting).

Embodiment Sample A-2

The optical storage medium A in the embodiment sample A-2 was identical to that of the embodiment sample A-1. Recording was conducted and evaluated with the same recording requirements except change in erasing power Pe to 3.8 [mW]. Results were 17.4 in R0, and 17.5 in R1 after irradiated once with a laser beam having the erasing power Pe=3.8 [mW] (R1/R0=1.006).

Initial characteristics and overwrite recording characteristics were as shown in FIG. 17: 6.8% in DOW-0 jitter, 8.6% in DOW-1 jitter, and 7.9% in DOW-9 jitter. Moreover, although not shown, DOW-10000 jitter was 9.2%. Thus, the embodiment sample A-2 was always stable in characteristics after overwriting, with excellent recording characteristics, like the embodiment sample A-1.

Embodiment Sample A-3

The optical storage medium A in the embodiment sample A-3 was identical to that of the embodiment sample A-1. Recording was conducted and evaluated with the same recording requirements except change in erasing power Pe to 5.6 [mW]. Results were 17.4 in R0, and 17.9 in R1 after irradiated once with a laser beam having the erasing power Pe=5.6 [mW] (R1/R0=1.029).

Initial characteristics and overwrite recording characteristics were as shown in FIG. 17: 7.0% in DOW-0 jitter, 8.7% in DOW-1 jitter, and 8.4% in DOW-9 jitter. Moreover, although not shown, DOW-10000 jitter was 9.5%. Thus, the embodiment sample A-3 was always stable in characteristics after overwriting, with excellent recording characteristics, like the embodiment sample A-1.

Comparative Sample A-4

The optical storage medium A in the comparative sample A-4 was identical to that of the embodiment sample A-1. Recording was conducted and evaluated with the same recording requirements except change in erasing power Pe to 6.0 [mW]. Results were 17.4 in R0, and 18.0 in R1 after irradiated once with a laser beam having the erasing power Pe=6.0 [mW] (R1/R0=1.034).

Initial characteristics and overwrite recording characteristics were as shown in FIG. 17: 8.8% in DOW-0 jitter, 10.8% in DOW-1 jitter, and 9.0% in DOW-9 jitter. Moreover, although not shown, DOW-10000 jitter was 12.20%. The comparative sample A-4 exhibited jitter over 10% in DOW 0 and DOW 10000, which causes adverse effects to error rate, thus suffered from poor recording characteristics.

Comparative Sample A-5

The optical storage medium A in the comparative sample A-5 was identical to that of the embodiment sample A-1. Recording was conducted and evaluated with the same recording requirements except change in erasing power Pe to 3.2 [mW]. Results were 17.4 in R0, and 17.4 in R1 after irradiated once with a laser beam having the erasing power Pe=3.2 [mW] (R1/R0=1.000).

Initial characteristics and overwrite recording characteristics were as shown in FIG. 17: 9.8% in DOW-0 jitter, 11.1% in DOW-1 jitter, and 10.8% in DOW-9 jitter. The comparative sample A-5 exhibited jitter over 10% in DOW 1 and DOW 9, thus suffered from poor recording characteristics.

Comparative Sample A-6

The optical storage medium A in the comparative sample A-6 was identical to that of the embodiment sample A-1. Recording was conducted and evaluated with the same recording requirements except change in erasing power Pe to 6.8 [mW]. Results were 17.4 in R0, and 18.2 in R1 after irradiated once with a laser beam having the erasing power Pe=6.8 [mW] (R1/R0=1.046).

Initial characteristics and overwrite recording characteristics were as shown in FIG. 17: 8.8% in DOW-0 jitter, 12.3% in DOW-1 jitter, and 9.8% in DOW-9 jitter. Moreover, although not shown, DOW-10000 jitter was 14.4%. The comparative sample A-6 exhibited jitter over 10% in DOW 1 and DOW 10000, which causes adverse effects to error rate, thus suffered from poor recording characteristics.

According to the evaluation, it is found that an optimum erasing power Pe1 having the relationship indicated by an expression (1) shown below can achieve 10% or less in jitter in optical recording:

$$1.000 < (R1/R0) < 1.030 \quad (1)$$

in which R0 is a reflectivity exhibited by an un-recorded section of the recording area 54, on which no data has ever been recorded, when irradiated with a reproducing laser beam from the LD 33, and R1 is a reflectivity exhibited by the un-recorded section when irradiated with a reproducing laser beam from the LD 33 after irradiated once with a laser beam having an erasing power Pe.

It is also found that an erasing power Pe larger than the optimum erasing power Pe1 that satisfies the expression (1) causes increase in DOW-10000 jitter whereas the former smaller than the latter causes increase in DOW-1 jitter. This is because a larger erasing power Pe applies a heavy load to a recording layer of a phase-change optical storage medium with a reversibly changeable layer structure, tending to cause segregation in composition of the recording layer whereas a smaller erasing power Pe cannot completely erase marks that have already been formed.

As discussed, an erasing power Pe has upper and lower limits in relation to overwrite characteristics. It is a general tendency that a larger erasing power Pe gives a higher reflectivity R1. In other words, there is a proportional relationship: the larger the erasing power Pe, the larger (R1/R0). The inventors of the present invention found it is essential that (R1/R0) satisfies the expression (1), based on the proportional relationship and the experimental results shown in FIG. 17.

Disclosed next is a method of determining the three values discussed above with the help of the reflectivity detector 46 when the three optimum values are not stored in the memory 451 of the optical recording apparatus shown in FIG. 6. A reproducing beam having a laser power Pr is irradiated onto the optical storage medium A from the optical head 34. A reproduced signal is then supplied from the quadrant photo-detector (not shown) of the optical head 34 to the reflectivity detector 46 that detects R0 based on the reproduced signal. This is followed by irradiation of a laser beam having a specific erasing power Pe for detection of R1, in the same way. The details of R0 and R1 are the same as disclosed above. The memory 451 has stored certain three values beforehand, but which are not the optimum values peculiar to the optical storage medium. The reflectivity detector 46 determines R1/R0 based on the detected R0 and R1.

One exemplary method of detecting reflectivities is to detect voltages V0 and V1 corresponding to the reflectivities R0 and R1 and calculate V1/V0, or R1/R0, at the reflectivity detector 46.

When the value of (R1/R0) calculated by the reflectivity detector 46 is larger than the expression (1), the system controller 45 controls the Pe-drive current source 431e to generate a smaller erasing power Pe. In contrast, when smaller than the expression (1), the system controller 45 controls the Pe-drive current source 431e to generate a larger erasing power Pe.

As described, the reflectivity detector 46 obtains a plurality of R1 corresponding to a plurality of erasing powers Pe and (R1/R0) for each R1, and selects a combination of R1 and R0 that satisfies the expression (1). An erasing power Pe that achieves the selected combination of R1 and R0 is stored in the memory 451 as an optimum erasing power Pe1. Obtaining the optimum erasing power Pe1 as disclosed is referred to as self-optimization.

[Study of Optimum Initialization Requirements]

The inventors of the present invention presupposed that initialization requirements at initialization apparatus 200 could affect recording and overwrite characteristics of optical storage media, and found out that the presumption is correct and there are initialization requirements that give excellent recording and overwrite characteristics, based on the following embodiment samples B-1 to B-5 and comparative samples B-6 to B-8.

Figure 7:
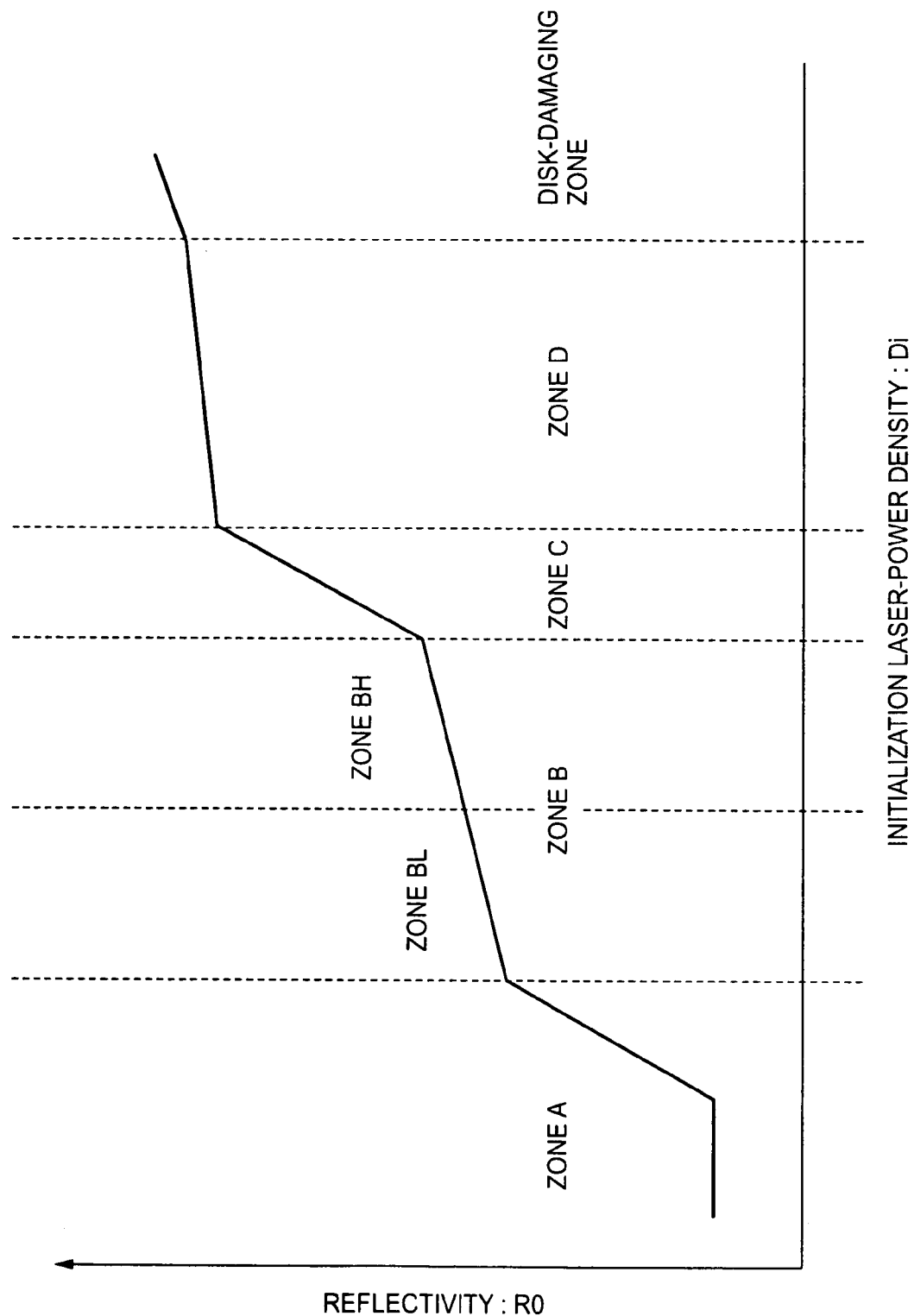
FIG. 7 is a view indicating a relationship between initialization laser-power density Di and reflectivity R0 of an optical storage medium A after initialized.

Shown in FIG. 7 is a relationship between initialization laser-power density Di and reflectivity R0 of an optical storage medium A after initialized. The initialization laser-power density Di is obtained by dividing a laser power of an initialization laser beam by an area irradiated with the initialization laser beam, and dividing a resultant quotient by a scanning speed of the initialization laser beam. The reflectivity R0 is an average reflectivity on one circular track.

A low initialization laser-power density Di in a zone A causes an amorphous section (As-depo) to remain after sputtering causing poor DOW-0 jitter characteristics, thus not acceptable.

A higher initialization laser-power density Di shifts the zone from A to B in which no amorphous section (As-depo) remains, with a comparatively small reflectivity change. A further higher initialization laser-power density Di shifts the zone to C with a bigger reflectivity change, D with a smaller reflectivity change, and a disk-damaging zone. In the disk-damaging zone, an extremely large laser power at initialization causes thermal physical damages to the recording layer and the surrounding layers of a disk (an optical storage medium).

Embodiment Sample B-1

The optical storage medium A in the embodiment sample B-1 was identical to that of the embodiment sample A-1. The recording layer 3 was initialized at 4.5 m/s in scanning linear velocity, 1600 mW in laser power and 220 μm in scanning pitch in accordance with the same initialization requirements as the embodiment sample A-1 (initialization laser-power density Di=1.42 [mW·S/(μm²·m)]; reflection zone after initialization=BH in FIG. 7).

In addition to R0 and R1 defined as above, R10 is defined which is a reflectivity exhibited by an un-recorded section when irradiated with a reproducing laser beam from the LD 33 after irradiated 10 times with a laser beam having an erasing power Pe. A difference in reflectivity ratio ((R10/R0)−(R1/R0)) was 0.092. The result for each reflectivity is shown in FIG. 18. A method of detecting a reflectivity R10 is the same way as disclosed above.

Measurements were conducted in the same way as the embodiment sample A-1. Initial characteristics and overwrite recording characteristics were as shown in FIG. 18: 6.5% in DOW-0 jitter, 8.0% in DOW-1 jitter, and 7.5% in DOW-9 jitter. Moreover, although not shown, DOW-10000 jitter was 8.5%. Thus, the embodiment sample B-1 was always stable in characteristics after overwriting, with excellent recording characteristics.

Embodiment Sample B-2

The optical storage medium A in the embodiment sample B-2 was identical to that of the embodiment sample B-1. The recording layer 3 was initialized in accordance with the same initialization requirements with the embodiment sample B-1 except change in laser power to 1700 mW (initialization laser-power density Di=1.51 [mW·S/(μm²·m)]; reflection zone after initialization=BH). The difference in reflectivity ratio was 0.043.

Measurements were conducted in the same way as the embodiment sample B-1. The recording characteristics were excellent as shown in FIG. 18.

Embodiment Sample B-3

The optical storage medium A in the embodiment sample B-3 was identical to that of the embodiment sample B-1. The recording layer 3 was initialized in accordance with the same initialization requirements with the embodiment sample B-1 except change in laser power to 1730 mW (initialization laser-power density Di=1.54 [mW·S/(μm²·m)]; reflection zone after initialization=BH). The difference in reflectivity ratio was 0.038.

Measurements were conducted in the same way as the embodiment sample B-1. The recording characteristics were excellent as shown in FIG. 18.

Embodiment Sample B-4

The optical storage medium A in the embodiment sample B-4 was identical to that of the embodiment sample B-1. The recording layer 3 was initialized in accordance with the same initialization requirements with the embodiment sample B-1 except change in laser power to 1400 mW (initialization laser-power density Di=1.24 [mW·S/(μm²·m)]; reflection zone after initialization=BH). The difference in reflectivity ratio was 0.124.

Measurements were conducted in the same way as the embodiment sample B-1. The recording characteristics were excellent as shown in FIG. 18.

Embodiment Sample B-5

The optical storage medium A in the embodiment sample B-5 was identical to that of the embodiment sample B-1. The recording layer 3 was initialized in accordance with the same initialization requirements with the embodiment sample B-1 except change in laser power to 1360 mW (initialization laser-power density Di=1.21 [mW·S/(μm²·m)]; reflection zone after initialization=BH). The difference in reflectivity ratio was 0.144.

Measurements were conducted in the same way as the embodiment sample B-1. The recording characteristics were excellent as shown in FIG. 18.

Comparative Sample B-6

The optical storage medium A in the comparative sample B-6 was identical to that of the embodiment sample B-1. The recording layer 3 was initialized in accordance with the same initialization requirements with the embodiment sample B-1 except change in laser power to 1300 mW (initialization laser-power density Di=1.16 [mW·s/(μm²·m)]; reflection zone after initialization=BL). The difference in reflectivity ratio was 0.160.

Measurements were conducted in the same way as the embodiment sample B-1. Jitter was 11.1% in DOW 1, as shown in FIG. 18, with poor characteristics in a few times of overwriting.

Comparative Sample B-7

The optical storage medium A in the comparative sample B-7 was identical to that of the embodiment sample B-1. The recording layer 3 was initialized in accordance with the same initialization requirements with the embodiment sample B-1 except change in scanning linear velocity to 4.0 m/s and laser power to 1600 mW (initialization laser-power density Di=1.60 [mW·S/(μm²·m)]; reflection zone after initialization=C). The difference in reflectivity ratio was 0.037.

Measurements were conducted in the same way as the embodiment sample B-1 litters were 12.8% and 10.8% in DOW 0 and DOW 1, respectively, as shown in FIG. 18, with poor characteristics in a few times of overwriting.

Comparative Sample B-8

The optical storage medium A in the comparative sample B-8 was identical to that of the embodiment sample B-1. The recording layer 3 was initialized in accordance with the same initialization requirements with the embodiment sample B-1 except change in scanning linear velocity to 4.0 m/s and laser power to 1800 mW (initialization laser-power density Di=1.80 [mW·S/(μm²·m)]; reflection zone after initialization=C). The difference in reflectivity ratio was 0.010.

Measurements were conducted in the same way as the embodiment sample B-1. Jitter was 16.3% in DOW 1, as shown in FIG. 18, with poor characteristics in a few times of overwriting.

According to the evaluation, it is found that it is preferable to initialize an optical storage medium with an initialization laser power density Di (initialization requirement) in which a difference in reflectivity ratio ((R10/R0)−(R1/R0)) calculated based on detected R0, R1 and R10, as already defined, satisfies an expression (2) shown below. This requirement offers excellent characteristics constant over a wide range of overwriting from a few times to many times.

$$0.030 < (R10/R0) - (R11/R0) < 0.150 \quad (2)$$

More specifically, $$0.038 \leq (R10/R0)-(R1/R0) < 0.144 \quad (3)$$

An acceptable range of the initialization laser-power density Di that satisfies the expression (2) is $1.20 \leq Di \leq 1.55$ according to FIG. 18. Initialization in accordance with this initialization requirement makes the reflectivity R0 remain in the zone BH in FIG. 7.

It is found that the initialization requirements with a difference in reflectivity ratio below 0.030 or over 0.150 like in the comparative samples B-6 to B-8 inevitably sets the reflectivity zone in BL, C or D. Under such initialization requirements, the initialization laser-power density Di was deviated from the range $1.20 \leq Di \leq 1.55$, resulted in poor overwrite characteristics in a few times of overwriting. Moreover, when the reflectivity zone was set in C like the comparative samples B-7, it was shifted to in a range from BH and D after initialization, resulted in poor DOW-0 characteristics.

Figure 8:
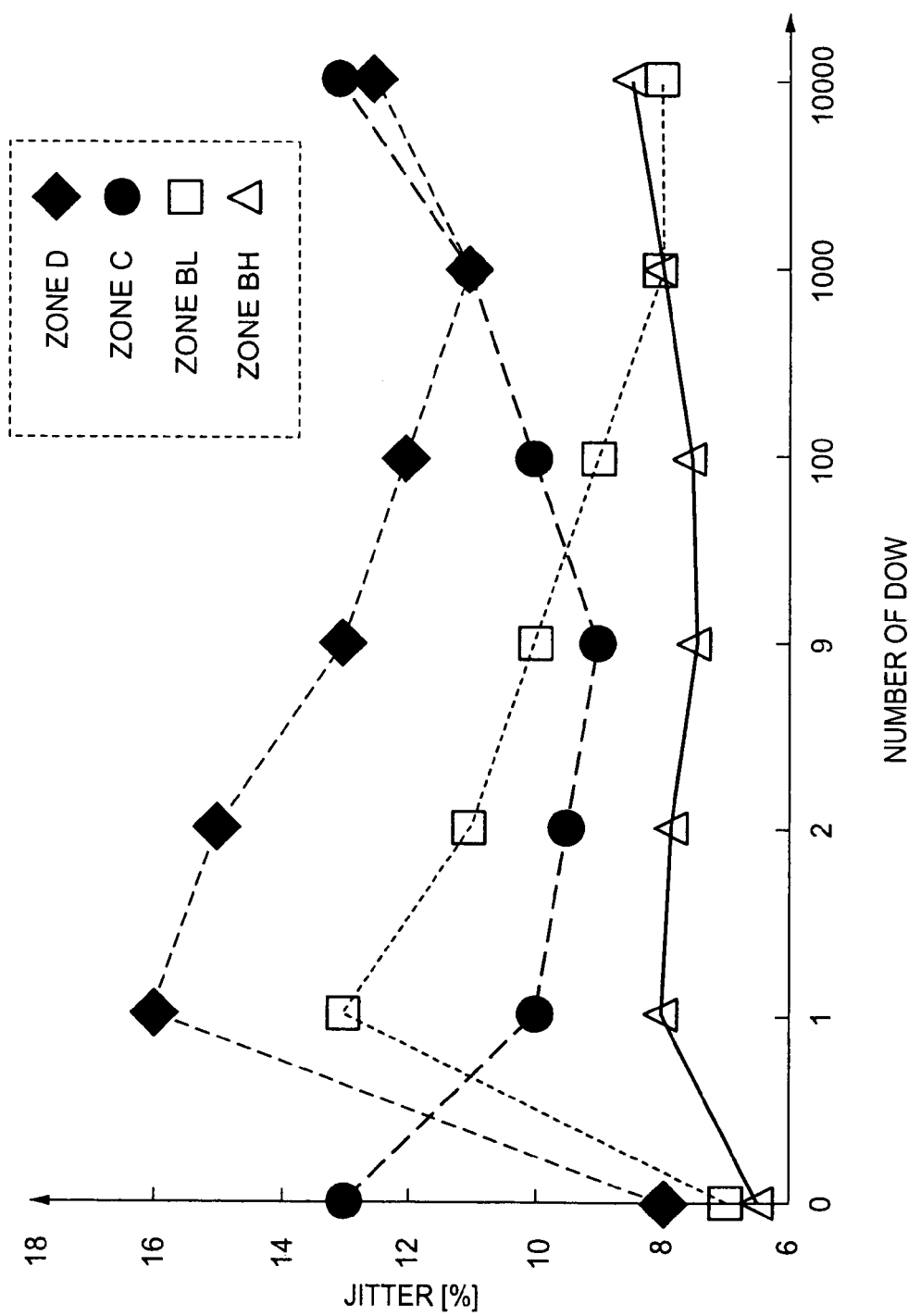
FIG. 8 is a view showing DOW-jitter characteristics indicating a relationship between the number of DOW over reflectivity zones B to D shown in FIG. 7 and jitter.

FIG. 8 shows DOW-jitter characteristics indicating a relationship between the number of overwriting (DOW) over the reflectivity zones B to D and jitter levels.

Initialization requirements based on an initialization laser-power density Di, or an initialization laser power and scanning linear velocity, in the zone D gives acceptable jitter in DOW 0 whereas excessive jitter in DOW 1, thus unacceptable. A difference in reflectivity in the zone D is smaller than 0.030, thus not satisfying the expression (2).

The initialization requirements with the zone C causes the zone to be shifted to in a range from BH and D, resulting in unstable initial characteristics, with excessive jitter especially in DOW 0, as shown in FIG. 8. A few times of repeated overwriting give acceptable jitter, nevertheless, DOW 9 (9-th overwriting) causes excessive jitter, thus unacceptable. A difference in reflectivity in the zone C is smaller than 0.030, like the zone D, thus not satisfying the expression (2).

In the zone B, as shown in FIG. 7, the reflectivity R0 gradually increases as the initialization laser-power density Di increases. The description is made further with a zone BL at a low reflectivity side and a zone BH at a high reflectivity side. DOW-jitter characteristics in the zone BL in FIG. 8 has acceptable jitter in DOW 0 whereas excessive jitter in DOW 1, thus unacceptable. A difference in reflectivity in the zone BL is larger than 0.150, thus not satisfying the expression (2).

In contrast, DOW-jitter characteristics in the zone BH is excellent as shown in FIG. 8, resulting in the optimum initialization requirements. In addition, the expression (2) is satisfied in the zone BH.

A possible reason for this excellent characteristics is that a crystallized condition created by application of an optimum erasing power Pe1 in recording is almost identical to an initialized condition in the zone BH created at the initialization apparatus 200.

An initialization laser-power density Di lower than the optimum initialization laser-power density Di that satisfies the initialization requirements in the zone BH cannot create a laser power required for crystallizing a recording layer, allowing amorphous sections to remain in the layer, which causes shift of reflectivity into the zone A or BL in FIG. 7, resulting in poor DOW characteristics. A difference in reflectivity in the zone A is larger than 0.300, thus not satisfying the expression (2). In contrast, a higher initialization laser-power density Di causes few amorphous sections so that the zone is inevitably shifted to C or D, or to the disk-damaging zone at a further higher density Di, resulting in poor DOW characteristics, as discussed above.

As disclosed, an appropriate range for the initialization laser-power density Di is $1.20 \leq Di \leq 1.55$ for satisfying the initialization requirements in the zone BH.

It is clear from FIG. 18 that the initialization requirements in the zone BH also satisfy the expression (1). This is because a crystallized condition created by application of an optimum erasing power Pe1 in recording is almost identical to an initialized condition in the zone BH created at the initialization apparatus 200, as discussed above.

It is further appropriate to apply an optimum erasing power that satisfies the expression (1) to an optical storage medium that has been initialized with an initialization laser-power density Di in $1.20 \leq Di \leq 1.55$, a preferable example of requirement that satisfies the expressions (1) and (2).

[Study of Optimum Power Ratio]

The Optimum recording requirements in recording to the optical storage medium A is further studied based on embodiment samples C-1 to C-3 and comparative samples C-4 and C-5.

Figure 9:
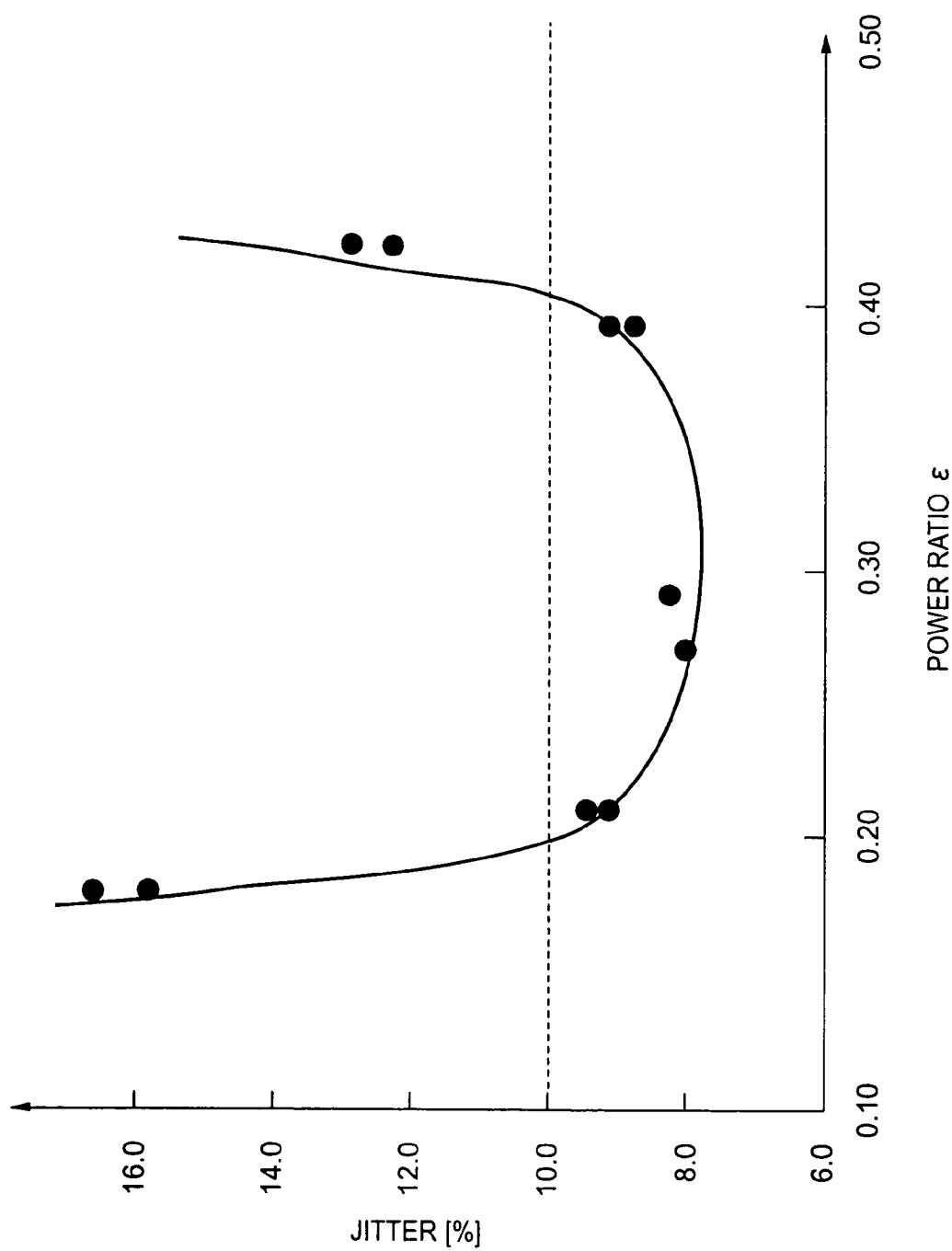
FIG. 9 is a view indicating a relationship between jitter and power ratio ϵ in DOW 1.

DOW-jitter characteristics for optical storage media depend on a power ratio $\epsilon$ (=Pe/Pw) between a recording power Pw and an erasing power Pe. FIG. 9 indicates a relationship between jitter and power ratio $\epsilon$ in DOW 1. The lowest and acceptable jitter is shown around $\epsilon$=0.30. Jitter increases from around 0.30 as the bottom irrespective of whether the power ratio $\epsilon$ becomes lower or higher. Jitter of 10% or less which is judged as giving less adverse effects to error rate appears at $\epsilon$=0.20~0.40, thus appropriate range of power ratio $\epsilon$ is $0.20 \leq \epsilon \leq 0.40$.

If $\epsilon$<0.20, a recording power Pw becomes smaller in relation to an erasing power Pe, which causes difficulty in forming recorded marks of enough size, resulting in unacceptably low signal strength. In contrast, if $\epsilon$>0.40, a recording power Pw becomes extremely larger in relation to an erasing power Pe, which causes crosserase, resulting in unacceptably adverse signal characteristics.

Embodiment Samples C-1 to C-3

The optical storage medium A in each embodiment sample was identical to that of the embodiment sample A-1. The initialization requirements were also the same as for embodiment sample A-1 (4.5 m/s in scanning linear velocity, 1600 mW in laser power and 220 μm in scanning pitch). The initialization laser power Pe was varied over the embodiment samples C-1 to C-3 in the range from 3.8 to 5.6 [mW] the same as the embodiment samples A-1 to A-3, with variation in recording power Pw and also in power ratio $\epsilon$(=Pe/Pw) in a range from 0.21 to 0.39. These values are shown in FIG. 19.

Measurements were conducted in the same way as the embodiment sample A-1. Initial characteristics and overwrite recording characteristics for the embodiment samples C were as shown in FIG. 19: 6.5% to 7.0% in DOW-0 jitter, 8.0% to 9.1% in DOW-1 jitter, 7.5% to 8.4% in DOW-9 jitter, and 8.0% to 9.8% in DOW-10000 jitter. Thus, each embodiment sample C was always stable in characteristics after overwriting, with excellent recording characteristics.

Comparative Sample C-4

The optical storage medium A in the comparative sample C-4 was identical to that of the embodiment sample A-1. The recording layer 3 was initialized in accordance with the same initialization requirements with the embodiment sample A-1. The measurements the same as the embodiment sample A-1 were conducted under the same recording requirements except change in recording power Pw to 13.0 mW and erasing power to 5.8 mW at a power ratio $\epsilon$ of 0.45. As shown in FIG. 19, jitter was 13.20% or higher in DOW-1 or further overwriting, resulting in poor overwrite characteristics.

Comparative Sample C-5

The optical storage medium A in the comparative sample C-5 was identical to that of the embodiment sample A-1. The recording layer 3 was initialized in accordance with the same initialization requirements with the embodiment sample A-1. The measurements the same as the embodiment sample A-1 were conducted under the same recording requirements except change in recording power Pw to 21.0 mW and erasing power to 3.8 mW at a power ratio $\epsilon$ of 0.18. As shown in FIG. 19, DOW-1 and DOW-10000 jitters were 12.2% and 12. 4%, respectively, resulting in poor overwrite characteristics.

According to the embodiment samples C-1 to C-3, the comparative samples C-4 and C-5, and also FIG. 9, it is found that an appropriate range of power ratio $\epsilon$ is $0.20 \leqq \epsilon \leqq 0.40$ as a recording requirement.

Figure 10:
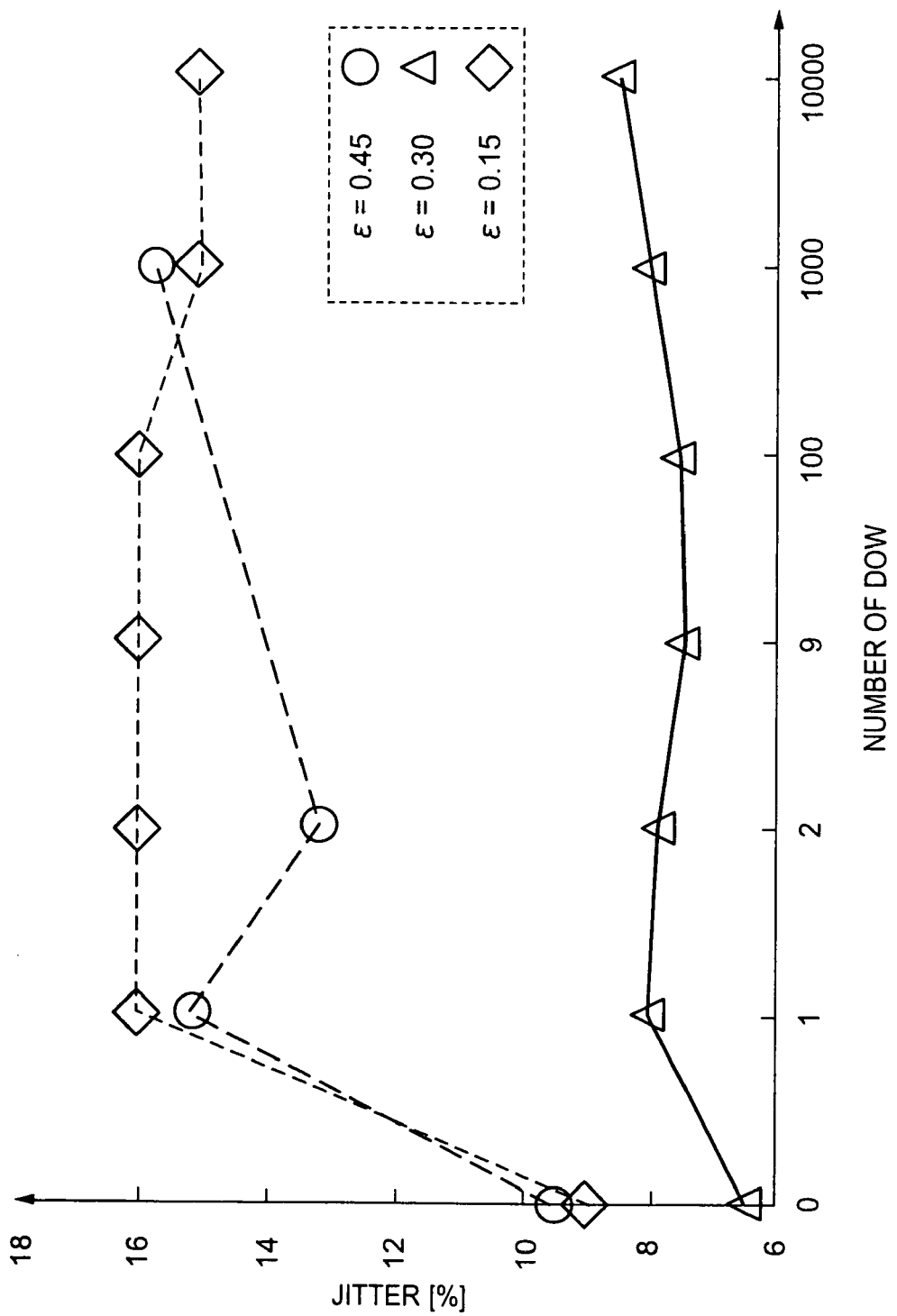
FIG. 10 is a view showing DOW-jitter characteristics indicating a relationship of jitter to the number of DOW.

FIG. 10 is a view showing DOW-jitter characteristics indicating a relationship of jitter to the number of DOW. Shown in FIG. 10 are at power ratios $\epsilon$ of 0.3, 0.15 smaller than 0.2, and 0.45 larger than 0.4. A power ratio $\epsilon$ smaller than 0.2 cannot completely erase a mark that has already been recorded due to extremely small erasing power Pe in relation to recording power Pw. For example, in FIG. 10, $\epsilon=0.15$ cannot provide acceptable jitter characteristics in DOW 1 or further overwriting. In contrast, a power ratio $\epsilon$ larger than 0.40 causes an unstable crystallized condition due to extremely large erasing power Pe in relation to recording power Pw. For example, in FIG. 10, $\epsilon=0.45$ cannot provide acceptable jitter characteristics in DOW 1.

It is appreciated that a power ratio $\epsilon$ of 0.3, in FIG. 10, gives jitter of 10% or less at any number of DOW. Thus, an acceptable range of the power ratio $\epsilon$ for jitter of 10% or less is $0.20 \leqq \epsilon \leqq 0.40$.

In FIG. 10, $\epsilon=0.15$ cannot provide acceptable jitter characteristics in DOW 1 or further overwriting. In contrast, a power ratio $\epsilon$ larger than 0.40 causes an unstable crystallized condition due to extremely large erasing power Pe in relation to recording power Pw. For example, in FIG. 10, $\epsilon=0.45$ cannot provide acceptable jitter characteristics in DOW 1. This results in that an acceptable range of the power ratio $\epsilon$ is $0.20 \leqq \epsilon \leqq 0.40$.

A power ratio $\epsilon$ located in a range from 0.20 or higher to 0.40 or lower is previously recorded on the read-in area 53 of the optical storage medium A shown in FIG. 3, as an optimum power ratio $\epsilon 1$. The optical recording apparatus retrieves optimum recording data, such as, the optimum erasing power Pe1 and the optimum power ratio $\epsilon 1$, described above, from the read-in area 53 and performs recording based on the data. Alternatively, optimum recording data stored previously stored or updated in the memory 451 of the system controller 45 of the optical recording apparatus may be used in recording.

The optimum recording power Pw1 can be obtained from the optimum erasing power Pe1 and the optimum power ratio $\epsilon 1$. The optimum recording data may further include this optimum recording power Pw1.

[Study of Power Ratio]

In this embodiment, a recording power Pw, an erasing power Pe and a power ratio $\epsilon$ (erase/recording: Pe/Pw) are expressed as follows for each recording liner velocity: a recording power Pwl and an erasing power Pel at low liner velocity; a recording power Pwm and an erasing power Pem at medium liner velocity; a recording power Pwh and an erasing power Peh at high liner velocity; and power ratios $\epsilon l$ (=Pel/Pwl), $\epsilon m$ (=Pem/Pwm), and $\epsilon h$ (=Peh/Pwh) at low liner velocity, medium liner velocity, and high liner velocity, respectively.

In this description, the low liner velocity, the medium liner velocity, and the high liner velocity correspond to low speed, medium speed, and high speed, respectively, for a relative scanning speed V of a recording, reproducing or erasing laser to an optical storage medium, with Vl<Vm<Vh in which Vl is low scanning speed, Vm is medium scanning speed, and Vh is high scanning speed.

For example, in CLV (Constant Linear Velocity), Vh=4× speed, Vm=2× speed, and Vl=1× speed may be combined or Vh=6× speed, Vm=4× speed, and Vl=2× speed may be combined. In CAV (Constant Angular Velocity), the scanning speed V depends on a position in a radius direction between the outermost radius and the innermost radius, for example, Vl on the innermost radius, Vh on the outermost radius, and Vm at any position on the radius therebetween.

The inventors of the present invention presupposed that a high and low relationship on power ratio $\epsilon$ ($\epsilon l$, $\epsilon m$ and $\epsilon h$) at respective recording linear velocity different from that disclosed in Japanese Unexamined Patent Publication Nos. 2001-297481 could offer excellent recording and overwrite characteristics for the optical storage medium A, and found out that the presumption is correct and determined a relationship on power ratio $\epsilon$ that offers excellent recording and overwrite characteristics, based on the following embodiment samples D-1 to D-3 and comparative samples D-4 to D-8.

Embodiment Sample D-1

Recording was conducted to the optical storage medium A from the incident plane 1a of the substrate 1 to the grooves of the recording layer 3.

Evaluation was conducted with an 8-16 (EFM+) modulation random pattern at recording linear velocity: 3.5 m/s (corresponding to DVD 1× speed) in low linear velocity recording; 7.0 m/s (corresponding to DVD 2× speed) in medium linear velocity recording; and 14.0 m/s (corresponding to DVD 4× speed) in high linear velocity recording, with unit clock: 38.2 ns at low linear velocity (1×); 19.1 ns at medium linear velocity (2×); and 9.6 ns at high linear velocity (4×).

The recording requirements for the recording pulse pattern were: Ttop=0.3 [T], Tmp=0.4 [T], and Tcl=1.3 [T] at a recording linear velocity of 3.5 m/s, a low linear velocity, with three levels in strength of laser beams: a recording power Pw (Pwl)=14.1 [mW], an erasing power Pe (Pel)=7.2 [mW], and a bottom power Pb=0.5 [mW] ($\epsilon l$=0.51).

The recording requirements at a recording linear velocity of 7.0 m/s, a medium linear velocity, were: Ttop=0.4 [T], Tmp=0.4 [T], and Tcl=0.9 [T], with a recording power Pw (Pwm)=16.2 [mW], an erasing power Pe (Pem)=7.6 [mW], and a bottom power Pb=0.5 [mW] ($\epsilon m$=0.47).

The requirements at a recording linear velocity of 14.0 m/s, a high linear velocity, were: Ttop=0.6 [T], Tmp=0.5 [T], and Tcl=0.0 [T], a recording power Pw (Pwh)=17.2

[mW], an erasing power Pe (Peh)=4.6 [mW], and a bottom power Pb=0.5 [mW] (εh=0.27).

The relationship on power ratio in the embodiment example D-1 is εh<εm<εl.

FIG. 20 shows recording characteristics in the embodiment sample D-1, and also embodiment samples D-2 and D-3, and comparative samples D-4 to D-8, described below. In each embodiment sample D and comparative sample D, a low linear velocity is DVD 1× speed (1×), a medium linear velocity is DVD 2× speed (2×), and a high linear velocity is DVD 4× speed (4×).

Jitters in 9-th overwriting (Direct Over Write: DOW9) were 7.3% at a low linear velocity (1×), 7.1% at a medium linear velocity (2×), and 7.8% at a high linear velocity (1×), resulting in below 10%, hence excellent, at every recording linear velocity. Jitters after 1000-th overwriting (DOW 1000), as overwrite characteristics, were 7.5% at 1×, 7.4% at 2×, and 8.2% at 4×, thus excellent, with reflectivity of 21.5%, 21.3%, and 20.2%, respectively, thus excellent reflectivity characteristics (reflectivity at 4× (high linear velocity) in DOW 1000 only shown in FIG. 20).

Jitter characteristics exhibiting jitter lower than 10% that does not affect error rate is defined as "excellent" whereas higher than 10% is defined as "poor". Reflectivity of 16% or higher is defined as "excellent" for ROM-compatibility with DVD players, for example.

The optimum power ratio ε(εh, εm, and εl) may vary a little bit which depends on the composition of the recording layer 3 of the optical storage medium A. The applicability of the present invention is verified with different compositions.

Embodiment Sample D-2

The optical storage medium in the embodiment sample D-2 was identical to that of the embodiment sample D-1, except change in the composition of the recording layer 3 to a target of an alloy of 4 elements Ga—Sb—In—Sn. The recording requirements at respective recording linear velocities were: a recording power Pwl=15.5 [mW] and an erasing power Pel=5.0 [mW] (εl=0.32) at 1×; a recording power Pwm=17.0 [mW] and an erasing power Pem=4.3 [mW] (εm-0.25) at 2×; and a recording power Pwh=18.5 [mW] and an erasing power Peh=3.7 [mW] (εh=0.20) at 4× (εh<εm<εl). The other recording requirements were the same as for the embodiment sample D-1 in measurements of recording characteristics.

As shown in FIG. 20, DOW-9 jitters were 7.9% at 1×, 7.6% at 2×, and 8.0% at 4×, resulting in below 100%, hence excellent, at every linear velocity, with excellent recording characteristics.

Embodiment Sample D-3

The optical storage medium in the embodiment sample D-3 was identical to that of the embodiment sample D-1, except change in the composition of the recording layer 3 to a target of an alloy of 4 elements Ag—In—Sb—Te. The recording requirements at respective recording linear velocities were: a recording power Pwl=14.0 [mW] and an erasing power Pel=9.8 [mW] (εl=0.70) at 1×; a recording power Pwm=16.0 [mW] and an erasing power Pem=9.6 [mW] (εm=0.60) at 2×; and a recording power Pwh=17.8 [mW] and an erasing power Peh=7.1 [mW] (εh=0.40) at 4× (εh<εm<εl). The other recording requirements were the same as for the embodiment sample D-1 in measurements of recording characteristics.

As shown in FIG. 20, DOW-9 jitters were 8.2% at 1×, 8.0% at 2×, and 8.0% at 4×, resulting in below 10%, hence excellent, at every linear velocity, with excellent recording characteristics.

Comparative Sample D-4

The requirements the same as the embodiment sample D-1 were applied, except εm=0.25 (Pem=4.1 mW, εm<εh<εl). The measurements were conducted in the same way as for the embodiment sample D-1. As shown in FIG. 20, DOW-9 jitter at 1× and 4× were the same as those for the embodiment sample D-1 whereas 25.0% at 2×, extremely unacceptable jitter, resulting in poor jitter characteristics. This is because erasure was not complete due to insufficient erasing power at medium liner velocity, with a power ratio εm=0.25 at 2× (medium liner velocity) smaller than εh=0.27 at 4× (high liner velocity).

Comparative Sample D-5

The requirements the same as the embodiment sample D-1 were applied, except εl=0.25 (Pel=3.5 mW, εl<εh<εm). The measurements were conducted in the same way as for the embodiment sample D-1. As shown in FIG. 20, DOW-9 jitter at 2× and 4× were the same as those for the embodiment sample D-1 whereas 25.5% at 1×, extremely unacceptable jitter, resulting in poor jitter characteristics. This is because erasure was not complete due to insufficient erasing power at low liner velocity, with a power ratio εl=0.25 at 1× (low liner velocity) smaller than εh=0.27 at 4× (high liner velocity).

Comparative Sample D-6

The requirements the same as the embodiment sample D-1 were applied, except εl=0.35 (Pel=4.9 mW, εh<εl<εm). The measurements were conducted in the same way as for the embodiment sample D-1. As shown in FIG. 20, DOW-9 jitter at 2× and 4× were the same as those for the embodiment sample D-1 whereas 11.1% at 1×, unacceptable jitter, resulting in poor jitter characteristics. This is because erasure was not complete due to insufficient erasing power at low liner velocity, with a power ratio εl=0.35 at 1× (low liner velocity) smaller than εm=0.47 at 2× (medium liner velocity).

Comparative Sample D-7

The requirements the same as the embodiment sample D-1 were applied, except εh=0.60 (Peh=10.3 mW, εm<εl<εh). The measurements were conducted in the same way as for the embodiment sample D-1. As shown in FIG. 20, DOW-9 jitter at 1× and 2× were the same as those for the embodiment sample D-1 whereas 13.8% at 4×, unacceptable jitter, resulting in poor jitter characteristics. DOW-1000 reflectivity was 14.3% at 4×, extremely lowered, with poor overwrite characteristics. This is because of an adverse crystallized condition of the recording layer 3 due to excessive cooling thereto caused by an extreme erasing power with high εh in 4× (high linear velocity) recording.

Comparative Sample D-8

The requirements the same as the embodiment sample D-1 were applied, except εl=0.35 and εh=0.50 (Pel=4.9 mW, Peh=8.6 mW, εl<εm<εh). The measurements were conducted in the same way as for the embodiment sample D-1. As shown in FIG. 20, DOW-9 jitter at 2× was the same as those for the embodiment sample D-1 whereas 11.1% at 1× and 13.0% at 4×, unacceptable jitter, resulting in poor jitter characteristics. DOW-1000 reflectivity was 16.8% at 4×, extremely lowered, with poor overwrite characteristics. This is because of an adverse crystallized condition of the recording layer 3 due to excessive cooling thereto caused by an extreme erasing power with high εh in 4× (high linear velocity) recording.

Figure 11:
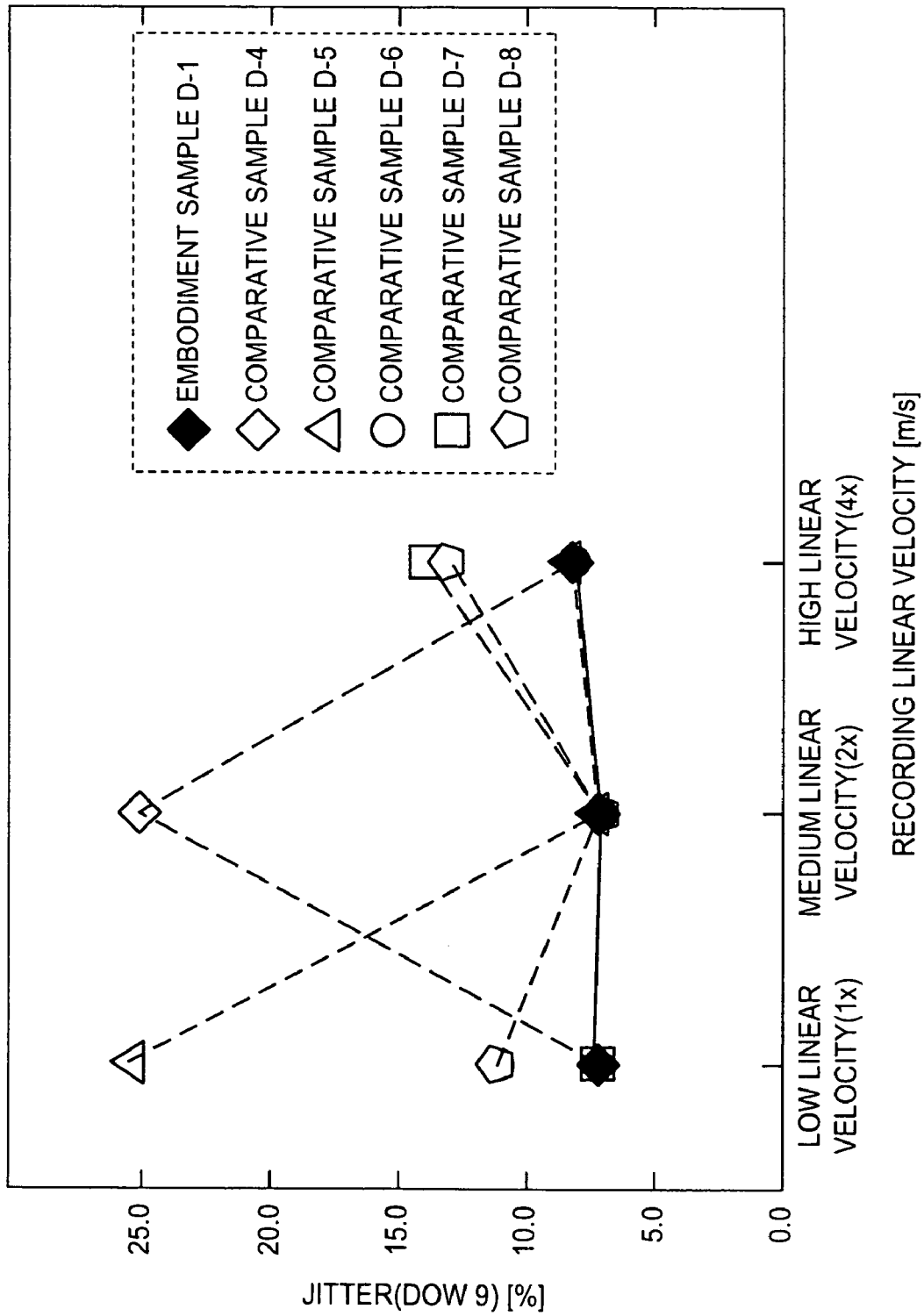
FIG. 11 is a view indicating DOW-9 jitter relationships at several recording linear velocities in an embodiment sample D-1 and comparatives samples D-4 to D-8.

FIG. 11 indicates DOW-9 jitter relationships at several recording linear velocities in the embodiment sample D-1 and the comparatives samples D-4 to D-8. The other embodiment samples D-2 and D-3, not shown in FIG. 11, exhibited DOW-9 jitters below 10% at every linear velocity, as clear from FIG. 20.

According to the evaluation, it is found that power ratios ε at their respective recording linear velocities that satisfy the following relationship (4) can offer excellent recording and overwrite characteristics:

$$\epsilon h < \epsilon m < \epsilon l \quad (4)$$

The inventors of the present invention further found, based on embodiment samples E-1 to E-3 and comparatives samples E-4 to E-8, that power ratios at their respective recording linear velocities that satisfies the relationship (4) can offer excellent recording and overwrite characteristics, even though the recording linear velocities are different from (1×, 2× and 4×) studied in the embodiment samples D-1 to D-3 and the comparatives samples D-4 to D-8. Also studied was the composition of the recording layer 3, different from those of the embodiment samples D-1 to D-3 and the comparatives samples D-4 to D-8.

The linear velocity applied to the following embodiment samples E-1 to E-3 and comparatives samples E-4 to E-8 were: DVD 2× speed (2×) at low linear velocity; DVD 4× speed (4×) at medium linear velocity; and DVD 6× speed (6×) at high linear velocity.

Embodiment Sample E-1

The optical storage medium in the embodiment sample E-1 was identical to that of the embodiment sample D-1, except change in the amount of Sb in the recording layer 3, increased to slightly accelerate the crystallization speed. The linear velocities applied here were: 7.0 m/s (corresponding to DVD 2× speed) in low linear velocity recording; 14.0 m/s (corresponding to DVD 4× speed) in medium linear velocity recording; and 21.0 m/s (corresponding to DVD 6× speed) in high linear velocity recording. Recording and reproduction were evaluated with an 8-16 (EFM+) modulation random pattern. The unit clocks applied here were: 19.1 ns at 2× speed; 9.6 ns at 4× speed; and 6.4 ns at 6× speed. The bit length, reproducing power Pr and recording measurement method were the same as those described above.

The multiple pulse sequence shown in FIG. 4 was used as the recording strategy at low linear velocity (2×) and medium linear velocity (4×). The multiple pulse sequence shown in FIG. 5 was used as the recording strategy at high linear velocity (6×). The optical recording apparatus used here was the same as for the embodiment samples D.

The recording requirements for the recording pulse pattern, at a recording linear velocity 7.0 m/s as low linear velocity, were a recording power Pwl=16.1 [mW], an erasing power Pel=8.0 [mW] and, a bottom power Pb=0.5 [mW] (εl=0.50).

The recording requirements, at a recording linear velocity 14.0 m/s as medium linear velocity, were: a recording power Pwm=17.2 [mW], an erasing power Pem=7.2 [mW] and, a bottom power Pb=0.5 [mW] (ε=0.42).

The recording requirements, at a recording linear velocity 21.0 m/s as high linear velocity, were: a recording power Pwh=20.0 [mW], an erasing power Peh=5.8 [mW] and, a bottom power Pb=0.5 [mW] (ε0.29) (εh<εm<εl: expression (4)).

FIG. 21 shows recording characteristics in the embodiment sample E-1. Also shown in FIG. 21 are recording characteristics in embodiment samples E-2 and E-3, and comparatives samples E-4 to E-8.

DOW-9 jitters were 7.5% at low linear velocity (2×), 7.4% at medium linear velocity (4×), and 8.1% at high linear velocity (6×), resulting in below 10%, hence excellent, at every linear velocity. DOW-1000 jitters were 7.9% at 2×, 7.9% at 4×, and 9.2% at 6×, excellent overwrite characteristics, with DOW-1000 reflectivity 20.5%, 20.2%, and 19.6%, excellent reflectivity characteristics (DOW-1000 reflectivity at 6× (high linear velocity) only shown in FIG. 21).

Embodiment Sample E-2

The optical storage medium in the embodiment sample E-2 was identical to that of the embodiment sample D-2, except change in the amount of Sb in the recording layer 3, increased to slightly accelerate the crystallization speed. The recording requirements at respective recording linear velocities were: a recording power Pwl=18.0 [mW] and an erasing power Pel=5.4 [mW] (εl=0.30) at 2×; a recording power Pwm=20.0 [mW] and an erasing power Pem=5.0 [mW] (εm=0.25) at 4×; and a recording power Pwh=22.0 [mW] and an erasing power Peh=4.4 [mW] (εh=0.20) at 6× (εh<εm<εl: expression (4)). The other recording requirements were the same as for the embodiment sample E-1 in measurements of recording characteristics.

As shown in FIG. 21, DOW-9 jitters were 8.3% at 2×, 8.0% at 4×, and 8.6% at 6×, resulting in below 10%, hence excellent, at every linear velocity, with excellent overwrite characteristics.

Embodiment Sample E-3

The optical storage medium in the embodiment sample E-3 was identical to that of the embodiment sample D-3, except change in the amount of Sb in the recording layer 3, increased to slightly accelerate the crystallization speed. The recording requirements at respective recording linear velocities were: a recording power Pwl=18.0 [mW] and an erasing power Pel=10.8 [mW] (εl=0.60) at 2×; a recording power Pwm=21.0 [mW] and an erasing power Pem=10.5 [mW] (εm=0.50) at 4×; and a recording power Pwh=23.0 [mW] and an erasing power Peh=9.2 [mW] (εh=0.40) at 6× (εh<εm<εl: expression (4)). The other recording requirements were the same as for the embodiment sample E-1 in measurements of recording characteristics.

As shown in FIG. 21, DOW-9 jitters were 8.0% at 2×, 7.6% at 4×, and 8.6% at 6×, resulting in below 10%, hence excellent, at every linear velocity, with excellent overwrite characteristics.

Comparative Sample E-4

The requirements the same as the embodiment sample E-1 were applied, except εm=0.25 (Pem=4.3 mW, εm<εh). The measurements were conducted in the same way as for the embodiment sample E-1. As shown in FIG. 21, DOW-9 jitter at 2× and 6× were the same as those for the embodiment sample E-1 whereas 25.1% at 4×, extremely unacceptable jitter, resulting in poor jitter characteristics. This is because erasure was not complete due to insufficient erasing power at medium liner velocity, with a power ratio $\epsilon m=0.25$ at 4× (medium liner velocity) smaller than $\epsilon h=0.29$ at 6× (high liner velocity).

Comparative Sample E-5

The requirements the same as the embodiment sample E-1 were applied, except $\epsilon l=0.25$ (Pel=4.0 mW, $\epsilon l<\epsilon h$). The measurements were conducted in the same way as for the embodiment sample E-1. As shown in FIG. 21, DOW-9 jitter at 4× and 6× were the same as those for the embodiment sample E-1 whereas 24.3% at 2×, extremely unacceptable jitter, resulting in poor jitter characteristics. This is because erasure was not complete due to insufficient erasing power at low liner velocity, with a power ratio $\epsilon l=0.25$ at 2× (low liner velocity) smaller than $\epsilon h=0.29$ at 6× (high liner velocity).

Comparative Sample E-6

The requirements the same as the embodiment sample E-1 were applied, except $\epsilon l=0.35$ (Pel=5.6 mW, $\epsilon m>\epsilon l<\epsilon h$). The measurements were conducted in the same way as for the embodiment sample E-1. As shown in FIG. 21, DOW-9 jitter at 4× and 6× were the same as those for the embodiment sample E-1 whereas 14.6% at 2×, unacceptable jitter, resulting in poor jitter characteristics. This is because erasure was not complete due to insufficient erasing power at low liner velocity, with a power ratio $\epsilon l=0.35$ at 2× (low liner velocity) smaller than $\epsilon m=0.42$ at 4× (medium liner velocity).

Comparative Sample E-7

The requirements the same as the embodiment sample E-1 were applied, except $\epsilon h=0.60$ (Peh=12.0 mW, $\epsilon m<\epsilon l<\epsilon h$). The measurements were conducted in the same way as for the embodiment sample E-1. As shown in FIG. 21, DOW-9 jitter at 2× and 4× were the same as those for the embodiment sample E-1 whereas 16.2% at 6×, unacceptable jitter, resulting in poor jitter characteristics. DOW-1000 reflectivity was 14.2%, extremely lowered, with poor overwrite characteristics. This is because of an adverse crystallized condition of the recording layer 3 due to excessive cooling thereto caused by an extreme erasing power with high $\epsilon h$ in 6× (high linear velocity) recording.

Comparative Sample E-8

The requirements the same as the embodiment sample E-1 were applied, except $\epsilon l=0.35$, $\epsilon h=0.50$ (Pel=5.6 mW, Peh=10.0 mW, $\epsilon l<\epsilon m<\epsilon h$). The measurements were conducted in the same way as for the embodiment sample E-1. As shown in FIG. 21, DOW-9 jitter at 4× was the same as those for the embodiment sample E-1 whereas 14.6% at 2× and 14.1% at 6×, unacceptable jitter, resulting in poor jitter characteristics. DOW-1000 reflectivity was lowered to 15.3% at 6×, with poor overwrite characteristics. This is because of an adverse crystallized condition of the recording layer 3 due to excessive cooling thereto caused by an extreme erasing power with high $\epsilon h$ in 6× (high linear velocity) recording.

Figure 12:
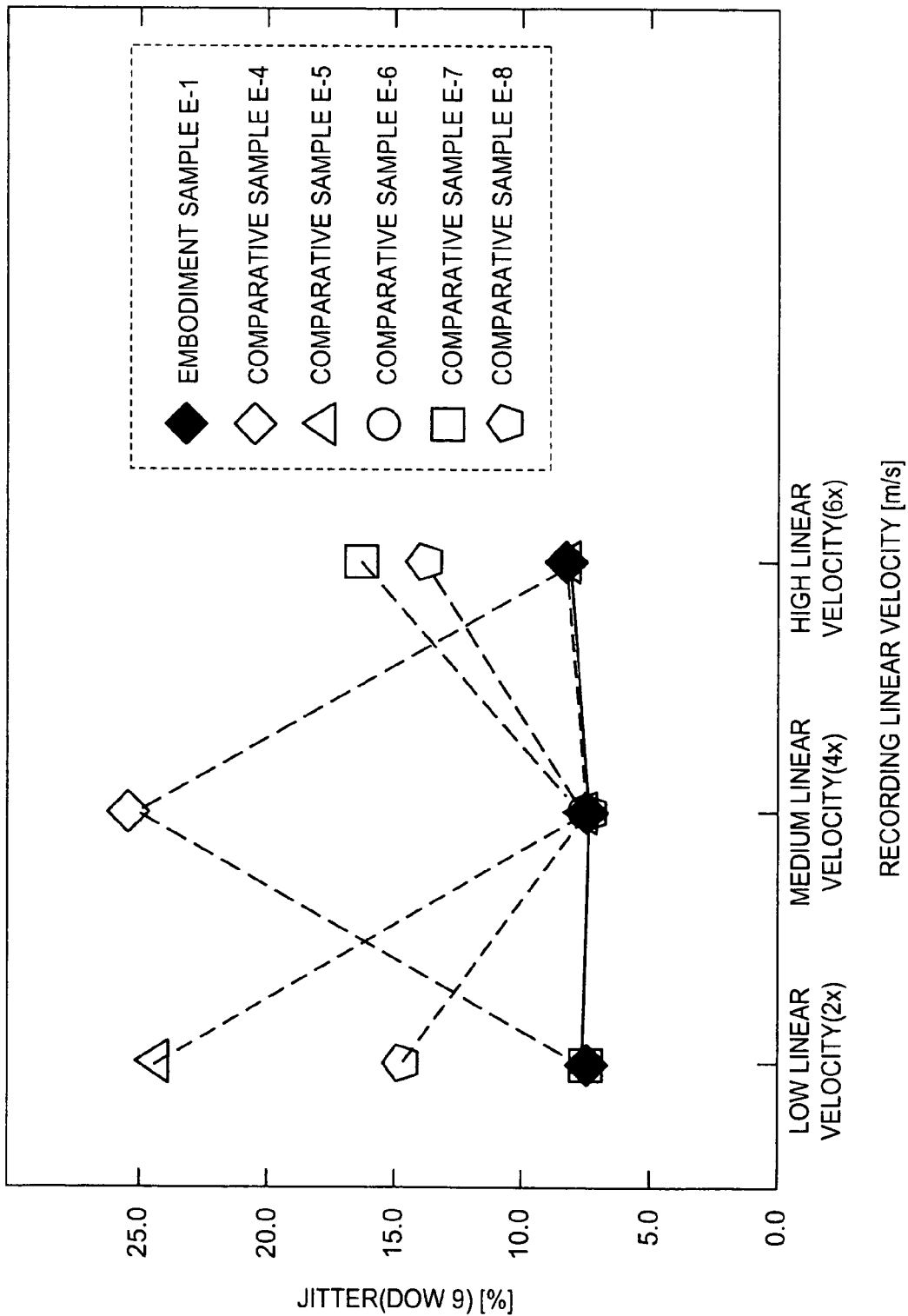
FIG. 12 is a view indicating DOW-9 jitter relationships at several recording linear velocities in an embodiment sample E-1 and comparatives samples E-4 to E-8.

FIG. 12 indicates DOW-9 jitter relationship at several recording linear velocities in the embodiment sample E-1 and the comparatives samples E-4 to E-8. FIGS. 12 and 21 teach power ratios $\epsilon$ at their respective recording linear velocities that satisfy the relationship (4) can offer excellent recording and overwrite characteristics. The other embodiment samples E-2 and E-3, not shown in FIG. 12, exhibited DOW-9 jitters below 10% at every linear velocity, as clear from FIG. 21.

Accordingly, it is found that power ratios $\epsilon$ at their respective recording linear velocities that satisfy the relationship (4) offered excellent recording and overwrite characteristics to the optical storage media in the embodiment samples D-1 to D-3 and the comparatives samples D-4 to D-8 at 1× speed in low linear velocity and 4× speed in high linear velocity and in the embodiment samples E-1 to E-3 and the comparatives samples E-4 to E-8 at 2× speed in low linear velocity and 6× speed in high linear velocity. It is also found that the relationship (4) is not affected by the composition of the recording layer 3 and the maximum recording linear velocity.

It is understood that increase in power ratio in order of $\epsilon h$ at high linear velocity, $\epsilon m$ at medium linear velocity, and $\epsilon l$ at low linear velocity that satisfies the expression (4) gives acceptable DOW-9 jitter at any recording linear velocity.

A power ratio at medium linear velocity lower than that at high linear velocity ($\epsilon m<\epsilon h$) causes excessive erasing power Peh in high linear velocity recording that allows an amorphous phase for the sections to be crystallized, resulting in poor characteristics beginning from initial recording characteristics, thus unacceptable. Adjustments to the composition of the recording layer 3 to avoid the amorphous phase causes decrease in reflectivity in DOW 1000 due to high erasing power Peh, resulting in poor recording characteristics, thus unacceptable.

A power ratio at low linear velocity lower than that at medium linear velocity ($\epsilon l<\epsilon m$) causes incomplete erasure due to insufficient erasing power Pel at low liner velocity, resulting in poor overwrite characteristics, thus unacceptable.

Accordingly, the relationship in the expression (4) gives excellent power ratio $\epsilon$ at each recording linear velocity irrespective of the composition of the recording layer 3 and the maximum recording linear velocity.

[Study of Relationship between Power Ratios $\epsilon l$ and $\epsilon h$]

The inventors of the present invention presupposed that a specific relationship between the power ratio $\epsilon l$ at low linear velocity and the power ratio $\epsilon h$ at high linear velocity could offer excellent recording and overwrite characteristics to optical storage media, and found out that the presumption is correct and determined such a specific relationship between the power ratios $\epsilon l$ and $\epsilon h$, based on the following embodiment samples F-1 to F-5 and comparative samples F-6 to F-11. The specific relationship is obtained here with a coefficient $\alpha$ ($=\epsilon h/\epsilon l$) as an index. The power ratios satisfy the expression (4) in each embodiment sample F and comparative sample F.

Embodiment Sample F-1

The requirements for this embodiment sample were the same as for the embodiment sample D-1 ($\epsilon h=0.27$ (Peh=4.6 mW, coefficient $\alpha=0.529$)). The recording characteristics were measured at 4× speed (4×) in high linear velocity in the same way as the embodiment sample D-1. As shown in FIG. 22, jitters were: 6.20/in DOW 0, 7.8% in DOW 1, and 7.8% in DOW 9, excellent, respectively, moreover, 8.20% in DOW 1000 with a reflectivity of 20.20%, excellent with no decrease (FIG. 22 only shows the reflectivity in DOW 1000 at 4×).

Also shown in FIG. 22 are the results for the embodiment samples F-2 to F-5 and comparative samples F-6 to F-11.

Embodiment Sample F-2

The requirements for this embodiment sample were the same as for the embodiment sample F-1 except change to $\epsilon h=0.23$ (Peh=4.0 mW, coefficient $\alpha=0.451$). The recording characteristics were measured at 4× in the same way as the embodiment sample F-1. As shown in FIG. 22, Jitters were excellent in DOW 0 to DOW 9, with a reflectivity of 19.5% in DOW 1000, excellent with no decrease.

Embodiment Sample F-3

The requirements for this embodiment sample were the same as for the embodiment sample F-1 except change to $\epsilon h=0.40$ (Peh=6.9 mW, $\alpha=0.784$). The recording characteristics were measured at 4× in the same way as the embodiment sample F-1. As shown in FIG. 22, jitters were excellent in DOW 0 to DOW 9, with a reflectivity of 20.7% in DOW 1000, excellent with no decrease.

Embodiment Sample F-4

The requirements for this embodiment sample were the same as for the embodiment sample D-1 except change in thickness of the first protective layer 2 of optical storage medium A (FIG. 2) to 50 nm and also change to $\epsilon l=0.40$ and $\epsilon h=0.21$ (Peh=3.6 mW, $\alpha=0.525$). The recording characteristics were measured at 4× in the same way as the embodiment sample D-1. As shown in FIG. 22, jitters were: 7.0% in DOW 0, 9.2% in DOW 1, and 8.6% in DOW 9, excellent jitter characteristics, moreover, 8.9% in DOW 1000 with a reflectivity of 18.3%, excellent with no decrease.

Embodiment Sample F-5

The requirements for the embodiment sample F-5 were the same as for the embodiment sample D-1 except change in thickness of the first protective layer 2 of optical storage medium A to 90 nm and also change to $\epsilon l=0.75$ and $\epsilon h=0.40$ (Peh=6.9 mW, $\alpha=0.53$). The recording characteristics were measured at 4× in the same way as the embodiment sample D-1. As shown in FIG. 22, jitters were: 7.2% in DOW 0, 8.8% in DOW 1, and 8.4% in DOW 9, excellent, moreover, 9.3% in DOW 1000 with a reflectivity of 22.6%, excellent with no decrease.

Comparative Sample F-6

The requirements for this sample were the same as for the embodiment sample F-1 except change to $\epsilon h=0.20$ (Peh=3.4 mW, $\alpha=0.392$). The recording characteristics were measured at 4× in the same way as the embodiment sample F-1. As shown in FIG. 22, jitters were: 12.3% in DOW 1 and 12.1% in DOW 9, with poor jitter characteristics. This is because erasure was not complete due to extremely small erasing power Peh of 3.4 mW at high linear velocity (4×), resulting in poor characteristics.

Comparative Sample F-7

The requirements for this sample were the same as for the embodiment sample F-1 except change to $\epsilon h=0.45$ (Peh=7.7 mW, $\alpha=0.882$). The recording characteristics were measured at 4× in the same way as the embodiment sample F-1. FIG. 22 shows 11.3% in DOW-1 jitter, with poor jitter characteristics. Moreover, a reflectivity was 17.6% in DOW 1000 at high linear velocity, not favorable, due to large erasing power Peh of 7.7 mW at high linear velocity (4×).

Comparative Sample F-8

The requirements for this sample were the same as for the embodiment sample F-4 except change to $\epsilon h=0.15$ (Peh=2.6 mW, $\alpha=0.375$). The recording characteristics were measured at 4× in the same way as the embodiment sample F-4. FIG. 22 shows an acceptable jitter of 9.1% in DOW 0, whereas 15.6% in DOW 1 with poor jitter characteristics.

Comparative Sample F-9

The requirements for this sample were the same as for the embodiment sample F-4 except change to $\epsilon h=0.34$ (Peh=5.8 mW, $\alpha=0.850$). The recording characteristics were measured at 4× in the same way as the embodiment sample F-4. FIG. 22 shows an acceptable jitter of 8.4% in DOW 0, whereas 13.2% in DOW 1 with poor jitter characteristics.

Comparative Sample F-10

The requirements for this sample were the same as for the embodiment sample F-5 except change to $\epsilon h=0.27$ (Peh=4.6 mW, $\alpha=0.360$). The recording characteristics were measured at 4× in the same way as the embodiment sample F-5. FIG. 22 shows an acceptable jitter of 9.2% in DOW 0, whereas 14.8% in DOW 1 with poor jitter characteristics.

Comparative Sample F-11

The requirements for this sample were the same as for the embodiment sample F-5 except change to $\epsilon h=0.65$ (Peh=11.2 mW, $\alpha=0.867$). The recording characteristics were measured at 4× in the same way as the embodiment sample F-5. FIG. 22 shows an acceptable jitter of 8.8% in DOW 0, whereas 12.2% in DOW 1 with poor jitter characteristics.

Figure 13:
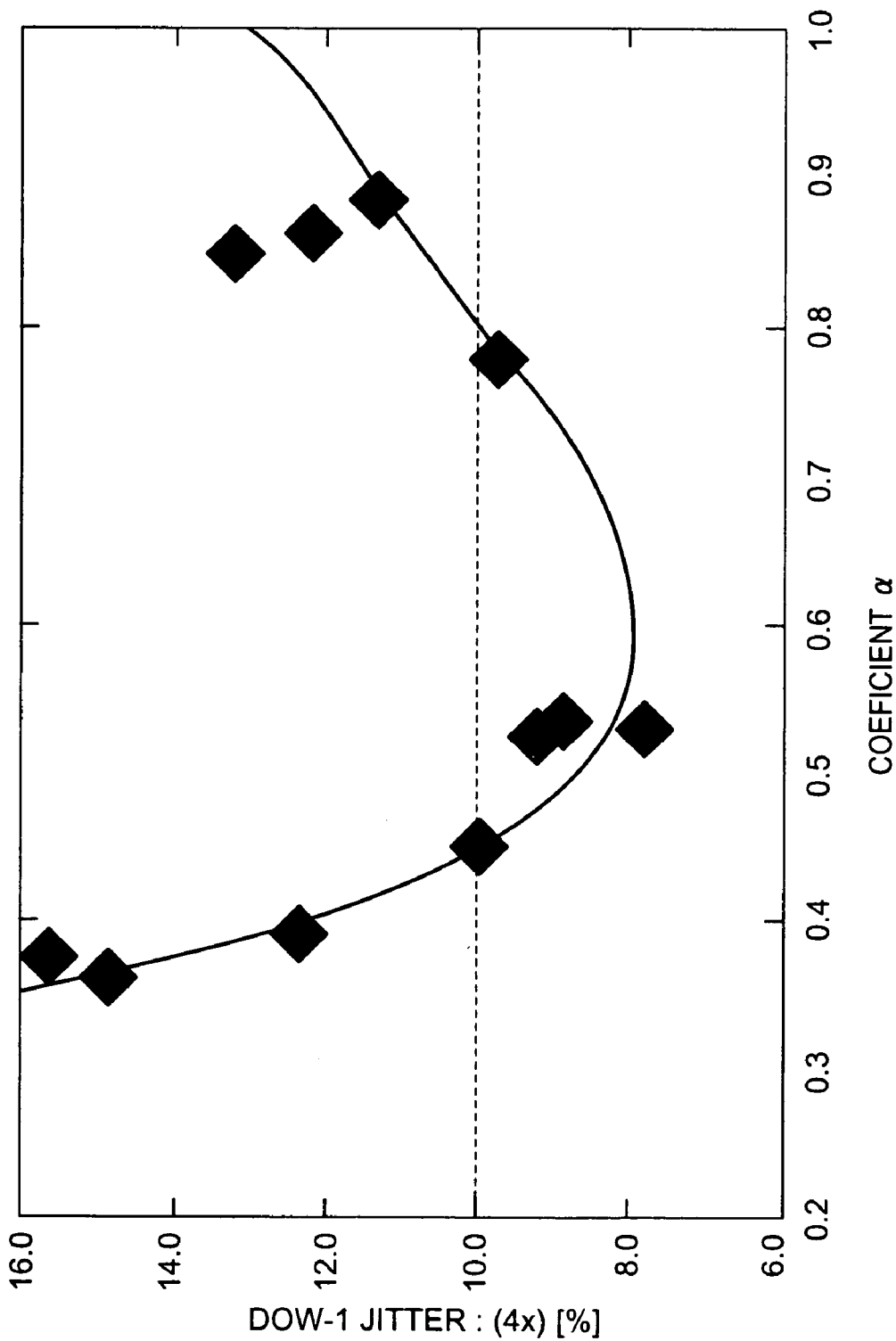
FIG. 13 is a view indicating a relationship between DOW-1 jitter and coefficient α in embodiment samples F-1 to F-5, and comparatives samples F-6 to F-11.

FIG. 13 indicates a relationship between DOW-1 jitter and coefficient $\alpha$, at 4×, in the embodiment samples F-1 and F-5, and the comparatives samples F-6 to F-11. It is found a fallen into a range indicated by an expression (5) shown below gives 10% or less in DOW-1 jitter. Any value of $\alpha$ out of the range indicated by an expression (5), or an extremely high or low power ratio $\epsilon h$ at high linear velocity cannot give any acceptable DOW-1 jitter.

$$0.45<\alpha<0.80 \tag{5}$$

The inventors of the present invention further found, based on embodiment samples G-1 to G-5 and comparatives samples G-6 to G-11, that the power ratio $\epsilon l$ at low linear velocity and the power ratio $\epsilon h$ at high linear velocity have a specific relationship that offers excellent recording and overwrite characteristics, even though the recording linear velocities are different from (1×, 2× and 4×) studied in the embodiment samples F-1 to F-5 and the comparatives samples F-6 to F-1. The coefficient $\alpha$ was also used as an index.

The linear velocity applied to the following embodiment samples G-1 to G-5 and comparatives samples G-6 to G-11 were: DVD 2× speed (2×) at low linear velocity; DVD 4× speed (4×) at medium linear velocity; and DVD 6× speed (6×) at high linear velocity. The power ratio satisfies the expression (4) in all of the embodiment samples G-1 to G-5 and comparatives samples G-6 to G-11.

Embodiment Sample G-1

The requirements for this embodiment sample were the same as for the embodiment sample E-1 ($\epsilon h=0.29$ (Peh=5.8 mW, coefficient $\alpha=0.580$)). The recording characteristics were measured at 6× speed (6×) in the same way as the embodiment sample E-1. As shown in FIG. 23, jitters were: 7.1% in DOW 0, 9.2% in DOW 1, and 8.1% in DOW 9, excellent, respectively, moreover, 9.2% in DOW 1000 with a reflectivity of 19.6%, excellent with no decrease.

Also shown in FIG. 23 are the results for the embodiment samples G-2 to G-5 and embodiment samples G-6 to G-11.

Embodiment Sample G-2

The requirements for this embodiment sample were the same as for the embodiment sample G-1 except change to $\epsilon h=0.23$ (Peh=4.6 mW, coefficient $\alpha=0.460$). The recording characteristics were measured at 6× in the same way as the embodiment sample G-1. As shown in FIG. 23, jitters were excellent in DOW 0 to DOW 9, with a reflectivity of 17.8% in DOW 1000, excellent with no noticeable decrease.

Embodiment Sample G-3

The requirements for this embodiment sample were the same as for the embodiment sample G-1 except change to $\epsilon h=0.39$ (Peh=8.0 mW, $\alpha=0.780$). The recording characteristics were measured at 6× in the same way as the embodiment sample G-1. As shown in FIG. 23, jitters were excellent in DOW 0 to DOW 9, with a reflectivity of 18.1% in DOW 1000, excellent with no noticeable decrease.

Embodiment Sample G-4

The requirements for this embodiment sample were the same as for the embodiment sample E-1 except change in thickness of the first protective layer 2 of optical storage medium A to 50 nm and also change to $\epsilon l=0.38$ and $\epsilon h=0.22$ (Peh=4.4 mW, $\alpha=0.579$). The recording characteristics were measured at 6× in the same way as the embodiment sample E-1. As shown in FIG. 23, jitters were: 7.3% in DOW 0, 9.1% in DOW 1, and 8.0% in DOW 9, excellent jitter characteristics, moreover, 9.1% in DOW 1000 with a reflectivity of 18.2%, excellent with no decrease.

Embodiment Sample G-5

The requirements for this embodiment sample were the same as for the embodiment sample E-1 except change in thickness of the first protective layer 2 of optical storage medium A to 90 nm and also change to $\epsilon l=0.75$ and $\epsilon h=0.38$ (Peh=7.6 mW, $\alpha=0.507$). The recording characteristics were measured at 6× in the same way as the embodiment sample E-1. As shown in FIG. 23, jitters were: 7.4% in DOW 0, 9.1% in DOW 1, and 7.9% in DOW 9, excellent, moreover, 9.9% in DOW 1000 with a reflectivity of 22.2%, excellent with no decrease.

Comparative Sample G-6

The requirements for this sample were the same as for the embodiment sample E-1 except change to $\epsilon h=0.20$ (Peh=4.0 mW, $\alpha=0.400$). The recording characteristics were measured at 6× in the same way as the embodiment sample G-1. As shown in FIG. 23, jitters were: 12.3% in DOW 1 and 12.2% in DOW 9, with poor jitter characteristics. This is because erasure was not complete due to extremely small erasing power Peh of 4.0 mW at high linear velocity (6×), resulting in poor characteristics.

Comparative Sample G-7

The requirements for this sample were the same as for the embodiment sample G-1 except change to $\epsilon h=0.45$ (Peh=9.0 mW, $\alpha=0.900$). The recording characteristics were measured at 6× in the same way as the embodiment sample G-1. FIG. 23 shows 13.3% in DOW-1 jitter and 12.1% in DOW-9 jitter, with poor jitter characteristics. Moreover, a reflectivity was 13.3% in DOW 1000, not favorable, due to large erasing power Peh of 9.0 mW at high linear velocity (6×).

Comparative Sample G-8

The requirements for this sample were the same as for the embodiment sample G-4 except change to $\epsilon h=0.15$ (Peh=3.0 mW, $\alpha=0.395$). The recording characteristics were measured at 6× in the same way as the embodiment sample G-4. FIG. 23 shows an acceptable jitter of 9.8% in DOW 0, whereas 15.3% in DOW 1 with poor jitter characteristics.

Comparative Sample G-9

The requirements for this sample were the same as for the embodiment sample G-4 except change to $\epsilon h=0.34$ (Peh=6.8 mW, $\alpha=0.895$). The recording characteristics were measured at 6× in the same way as the embodiment sample G-4. FIG. 23 shows an acceptable jitter of 9.5% in DOW 0, whereas 11.1% in DOW 1 with poor jitter characteristics.

Comparative Sample G-10

The requirements for this sample were the same as for the embodiment sample G-5 except change to $\epsilon h=0.28$ (Peh=5.6 mW, $\alpha=0.373$). The recording characteristics were measured at 6× in the same way as the embodiment sample G-5. FIG. 23 shows a relatively acceptable jitter of 9.7% in DOW 0, whereas 14.2% in DOW 1 with poor jitter characteristics.

Comparative Sample G-11

The requirements for this sample were the same as for the embodiment sample G-5 except change to $\epsilon h=0.61$ (Peh=12.2 mW, $\alpha=0.813$). The recording characteristics were measured at 6× in the same way as the embodiment sample G-5. FIG. 23 shows an acceptable jitter of 9.8% in DOW 0, whereas 12.3% in DOW 1 with poor jitter characteristics.

Figure 14:
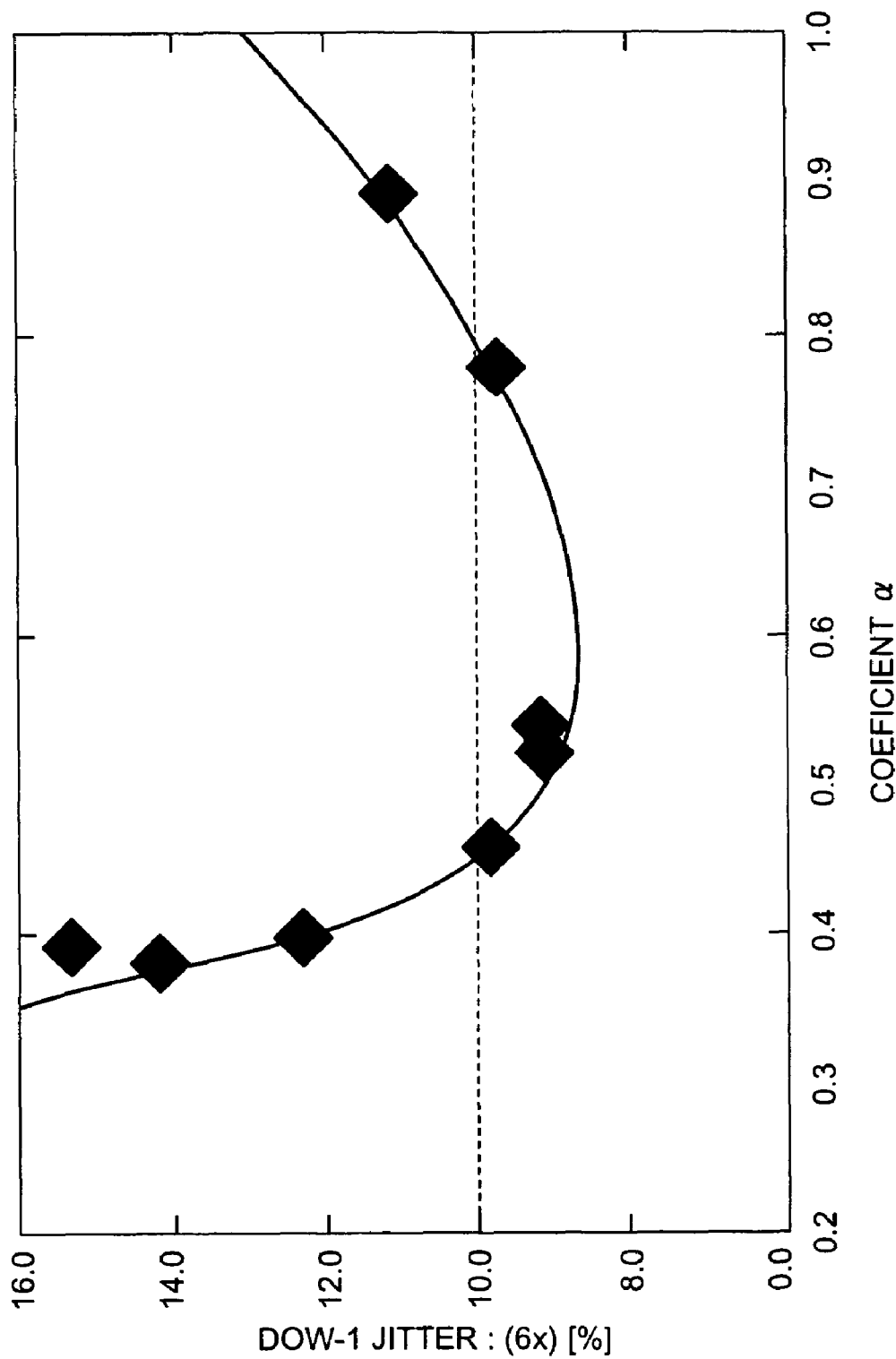
FIG. 14 is a view indicating a relationship between DOW-1 jitter and coefficient α in embodiment samples G-1 to G-5 and comparatives samples G-6 to G-11.

FIG. 14 indicates a relationship between DOW-1 jitter and coefficient $\alpha$, at 6×, in the embodiment samples G-1 and G-5, and the comparatives samples G-6 to G-11. It is found a fallen into a range indicated by the expression (5) gives 10% or less in DOW-1 jitter, also in the embodiment samples G-1 and G-5, and the comparatives samples G-6 to G-11. Any value of $\alpha$ out of the range indicated by the expression (5), or an extremely high or low power ratio $\epsilon h$ at high linear velocity cannot give any acceptable DOW-1 jitter.

Accordingly, it is found that a specific relationship between the power ratio $\epsilon l$ at low linear velocity and the power ratio $\epsilon h$ at high linear velocity offers excellent recording and overwrite characteristics, especially, acceptable DOW-1 jitter to the optical storage media in the embodiment samples F-1 to F-5 and the comparatives samples F-6 to F-11 at 1× speed in low linear velocity and 4× speed in high linear velocity and in the embodiment samples G-1 to G-5 and the comparatives samples G-6 to G-11 at 2× speed in low linear velocity and 6× speed in high linear velocity. It is also found that an acceptable coefficient α expressing a ratio εh/εl falls into the range in the expression (5).

Accordingly, the expression (4) is a fundamental requirement for an acceptable DOW-1 jitter. Moreover, the expression (5) is a feasible requirement in addition to the expression (4).

An extremely small erasing power Peh with a<0.45 at high linear velocity causes incomplete erasure, resulting in increased jitter in DOW 1 or further DOW, thus unacceptable. In addition, a relatively large erasing power Peh with 0.80<α at high linear velocity allows an amorphous phase for the sections to be crystallized, resulting in adverse DOW-1 jitter characteristics. Thus, a feasible range for a fallen into the expression (5) offers optical storage media excellent recording and overwrite characteristics.

A further feasible range is 0.55<α<0.65 that gives jitter lower than 9%, under consideration of environmental stability of storage media, margin of error in usual recording apparatus, etc.

[Study of Relation in Recording Power]

It was also presupposed that a specific relationship among recording powers Pwl, Pwm and Pwh at low, medium and high linear velocities, respectively, could affect excellent recording and overwrite characteristics of optical storage media, and found out that the presumption is correct, or there is an optimum relationship among the recording powers, based on the following embodiment samples H-1 and H-2 and comparative samples H-3 to H-5.

Embodiment Sample H-1

The requirements for this embodiment sample were the same as for the embodiment sample D-1 (Pwl=14.1 mW, Pwm=16.2 mW, Pwh=17.2 mW, Pwl<Pwm<Pwh). Measurements were conducted in the same way as the embodiment sample D-1. As shown in FIG. 24, DOW-9 jitters were: 7.3% at low linear velocity (1×), 7.1% at medium linear velocity (2×), and 7.8% at high linear velocity (4×), excellent, respectively, moreover, 60.8%, 64.9%, and 65.9%, respectively, excellent, in modulation amplitude (DOW 9).

Also shown in FIG. 24 are the results for the embodiment sample H-2 and the comparative samples H-3 to H-5.

Figure 15:
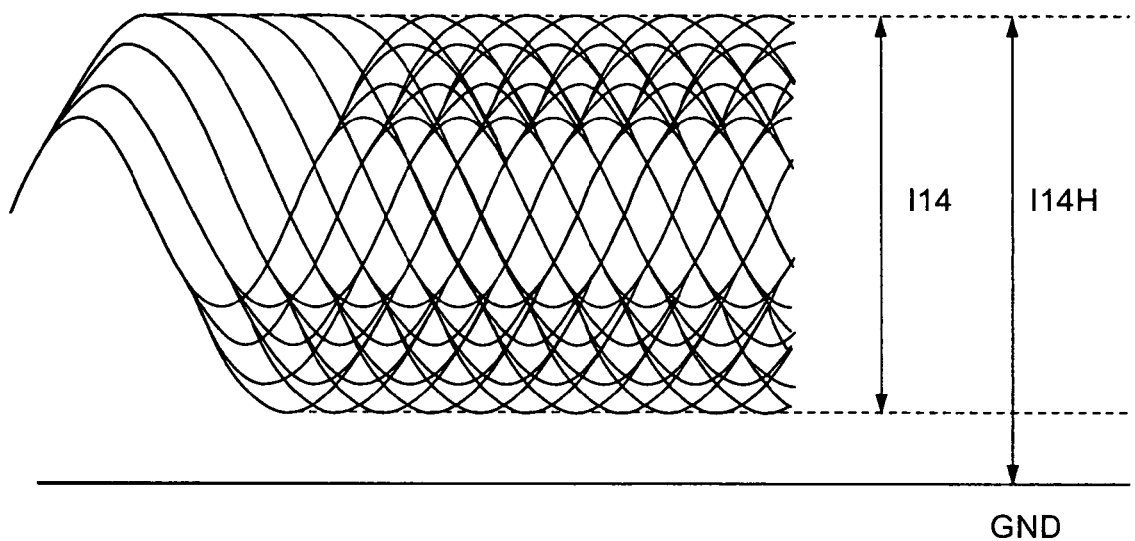
FIG. 15 is a view illustrating signal strength.

A modulation amplitude represents a signal strength, or (modulation amplitude)=(I14/I14H), as indicated in FIG. 15.

A modulation amplitude of 60% (DVD standard) or higher is defined as "excellent".

Embodiment Sample H-2

The requirements for this embodiment sample were the same as for the embodiment sample H-1 except change to Pwl=15.2 mW, Pwm=15.8 mW, and Pwh=16.2 mW (Pwl<Pwm<Pwh). Measurements were conducted in the same way as the embodiment sample H-1. As shown in FIG. 24, DOW-9 jitters were: 7.7% at 1×, 7.2% at 2×, and 8.0% at 4×, excellent, respectively, moreover, 61.1%, 63.9%, and 63.2%, respectively, excellent, in modulation amplitude.

Comparative Sample H-3

The requirements for this sample were the same as for the embodiment sample H-1 except change to Pwh=15.0 mW (Pwl<Pwh<Pwm). Measurements were conducted in the same way as the embodiment sample H-1. As shown in FIG. 24, the comparative sample H-3 was inferior to the embodiment sample H-1 in DOW-9, with jitter of 11.5% at 4× larger than that for the sample H-1, with modulation amplitude of 56.2% smaller than that for the sample H-1.

Comparative Sample H-4

The requirements for this sample were the same as for the embodiment sample H-1 except change to Pwm=13.0 mW (Pwm<Pwl<Pwh). Measurements were conducted in the same way as the embodiment sample H-1. As shown in FIG. 24, the comparative sample H-4 was inferior to the embodiment sample H-1 in DOW-9, with jitter of 12.1% at 2× larger than that for the sample H-1, with modulation amplitude of 52.3% smaller than that for the sample H-1.

Comparative Sample H-5

The requirements for this sample were the same as for the embodiment sample H-1 except change to Pwl=17.8 mW (Pwm<Pwh<Pwl). Measurements were conducted in the same way as the embodiment sample H-1. As shown in FIG. 24, the comparative sample H-4 was inferior to the embodiment sample H-1 in DOW-9, with jitter of 10.9% at 1× larger than that for the sample H-1.

Accordingly, it is found that a higher recording linear velocity with no increase in recording power causes power shortage, resulting in insufficient signal strength (=modulation amplitude) and increased jitter. In contrast, recording with a high recording power at a low linear velocity resulting in excessive laser-power density causes increase in crosstalk and thus in jitter.

It is thus feasible that an expression (6) shown below is satisfied, which gives a larger recording power as a linear velocity becomes higher, for excellent recording and overwrite characteristics for optical storage media.

$$Pwl < Pwm < Pwhtm \quad (6)$$

The inventors of the present invention further found, based on embodiment samples I-1 and I-2 and comparatives samples I-3 to I-5, that a relationship among the recording powers indicated by the expression (6) at their respective recording linear velocities can offer excellent recording and overwrite characteristics to optical storage media, even though the recording linear velocities are different from (1×, 2× and 4×) studied in the embodiment samples H-1 and H-2 and the comparatives samples H-3 to H-5.

The linear velocity applied to the following embodiment samples I-1 and I-2 and comparatives samples I-3 to I-5 were: DVD 2× speed (2×) at low linear velocity; DVD 4× speed (4×) at medium linear velocity; and DVD 6× speed (6×) at high linear velocity.

Embodiment Sample I-1

The requirements for this embodiment sample were the same as for the embodiment sample E-1 (Pwl=16.1 mW, Pwm=17.2 mW, Pwh=20.0 mW, Pwl<Pwm<Pwh). Measurements were conducted in the same way as the embodiment sample E-1. As shown in FIG. 25, DOW-9 jitters were: 7.5% at low linear velocity (2×), 7.4% at medium linear velocity (4×), and 8.1% at high linear velocity (6×), excellent, respectively, moreover, 61.2%, 63.5%, and 62.2%, respectively, excellent, in modulation amplitude (DOW 9).

Also shown in FIG. 25 are the results for the embodiment sample I-2 and the comparative samples I-3 to I-5.

Embodiment Sample I-2

The requirements for this embodiment sample were the same as for the embodiment sample I-1 except change to Pwl=15.5 mW, Pwm=16.4 mW, and Pwh=18.6 mW (Pwl<Pwm<Pwh). Measurements were conducted in the same way as the embodiment sample I-1. As shown in FIG. 25, DOW-9 jitters were: 8.30% at 2×, 8.2% at 4×, and 9.2% at 6×, excellent, respectively, moreover, 60.3%, 61.9%, and 60.1%, respectively, excellent, in modulation amplitude.

Comparative Sample I-3

The requirements for this sample were the same as for the embodiment sample I-1 except change to Pwh=16.6 mW (Pwl<Pwh<Pwm). Measurements were conducted in the same way as the embodiment sample I-1. As shown in FIG. 25, the comparative sample I-3 was inferior to the embodiment sample I-1 in DOW-9, with jitter of 13.6% at 6× larger than that for the sample I-1, with modulation amplitude of 52.8% smaller than that for the sample I-1.

Comparative Sample I-4

The requirements for this sample were the same as for the embodiment sample I-1 except change to Pwm=14.0 mW (Pwm<Pwl<Pwh). Measurements were conducted in the same way as the embodiment sample I-1. As shown in FIG. 25, the comparative sample I-4 was inferior to the embodiment sample I-1 in DOW-9, with jitter of 12.7% at 4× larger than that for the sample I-1, with modulation amplitude of 52.3% smaller than that for the sample I-1.

Comparative Sample I-5

The requirements for this sample were the same as for the embodiment sample I-1 except change to Pwl=21.0 mW (Pwm<Pwh<Pwl). Measurements were conducted in the same way as the embodiment sample I-1. As shown in FIG. 25, the comparative sample I-5 was inferior to the embodiment sample I-1 in DOW-9, jitter of 11.2% at 2× larger than that for the sample I-1.

Accordingly, it is found that recording powers that satisfy the expression (6) at respective recording linear velocities can offer excellent recording and overwrite characteristics.

Accordingly, it is found that a higher recording linear velocity with no increase in recording power causes power shortage, resulting in insufficient signal strength (=modulation amplitude) and increased jitter in the embodiment samples H-1 and H-2 and the comparatives samples H-3 to H-5 at 1× speed in low linear velocity and 4× speed in high linear velocity and in the embodiment samples I-1 and I-2 and the comparatives samples I-3 to I-5 at 2× speed in low linear velocity and 6× speed in high linear velocity. Recording with a high recording power at a low linear velocity resulting in excessive laser-power density causes increased crosstalk and thus increased jitter. These findings teach the expression (6) that gives a larger recording power as a linear velocity becomes higher is a feasible requirement.

Increase in recording power Pwh in a range Pwl× 1.2~Pwl×1.4 (although a little bit rough) in accordance with increase in recording speed is another feasible requirement for larger mark widths to give sufficient recorded signals, which otherwise cause decrease in density of recording power per area resulted from increase in recording linear velocity.

Figure 16:
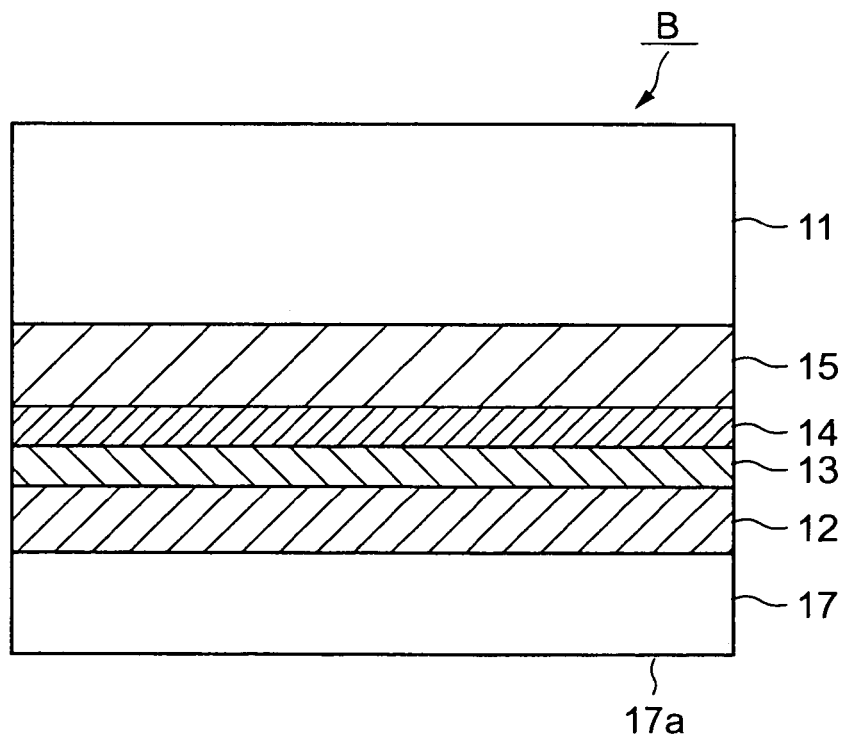
FIG. 16 is an enlarged cross section illustrating another embodiment of an optical storage medium according to the present invention.

Not only the phase-change optical storage media, such as, DVD-RW, as disclosed above, ultrahigh density phase-change optical storage media having a structure, for example, shown in FIG. 16 can offer similar advantages.

An optical storage medium B, shown in FIG. 16, has a structure in which a first protective layer 12, a recording layer 13, a second protective layer 14, a reflective layer 15, and a substrate 11 are laminated in order on a protective layer 17 having a bottom surface that is an incident plane 17a on which a recording or reproducing laser beam, or an erasing laser beam is incident.

As disclosed above in detail, the present invention provides an optical recording method, an optical recording apparatus and an optical storage medium that offer excellent recording characteristics even at higher recording speed (in higher linear-velocity recording at and over, for example, DVD 4× speed (linear-velocity: 14 m/s)) and maintain excellent overwrite characteristics in one-time or plural times of overwriting.

Moreover, the present invention provides an optical recording method, an optical recording apparatus and an optical storage medium that offer excellent recording characteristics in recording at from low linear velocity to higher recording speed (in higher linear-velocity recording at and over, for example, DVD 4× speed (linear-velocity: 14 m/s)) and maintain excellent overwrite characteristics in one-time or several times of overwriting, under specific recording requirements defined at their respective recording linear velocities in multispeed recording.

According to the present invention, excellent recording characteristics are achieved at higher recording speed and maintained in one-time or plural times of overwriting.

Furthermore, according to the present invention, excellent recording characteristics are achieved at multiple recording linear velocities and maintained in one-time or plural times of overwriting.

What is claimed is:

1. An optical recording method of recording information to be recorded in a recording layer of a phase-change optical storage medium, the method comprising the steps of:

a modulation step of modulating the information to be recorded to generate modulated data;

a mark-length generation step of generating desired mark-length data based on the modulated data; and a recording step of generating a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiating a recording light beam onto the recording layer in accordance with the recording pulse pattern to record at least one recorded mark representing the information to be recorded, wherein the recording step uses an optimum erasing power, as the erasing power, the optimum erasing power satisfying an expression (1):

$$1.000 < (R1/R0) < 1.030 \quad (1)$$

in which R0 is a reflectivity exhibited by an un-recorded section of the recording layer, on which no data has ever been recorded, when irradiated with a reproducing light beam, and R1 is a reflectivity exhibited by the un-recorded section when irradiated with the reproducing light beam after irradiated once with a beam having the erasing power.

2. The optical recording method according to claim 1, wherein a power ratio $\epsilon$, wherein $\epsilon = Pe/Pw$, of the erasing power to the recording power is $0.20 \leq \epsilon \leq 0.40$ in which Pe is the erasing power and Pw is the recording power.

3. An optical recording apparatus for recording information to be recorded in a recording layer of a phase-change optical storage medium, comprising:

an encoder to modulate the information to be recorded to generate modulated data;

a mark-length generator to generate desired mark-length data based on the modulated data; and a recorder to generate a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiate a recording light beam onto the recording layer in accordance with the recording pulse pattern to record at least one recorded mark representing the information to be recorded, wherein the recorder uses an optimum erasing power, as the erasing power, the optimum erasing power satisfying an expression (1):

$$1.000 < (R1/R0) < 1.030 \tag{1}$$

in which R0 is a reflectivity exhibited by an un-recorded section of the recording layer, on which no data has ever been recorded, when irradiated with a reproducing light beam, and R1 is a reflectivity exhibited by the un-recorded section when irradiated with the reproducing light beam after irradiated once with a light beam having the erasing power.

4. The optical recording apparatus according to claim 3 further comprising a storage to store identification information indicating the optimum erasing power, wherein the recorder determines the optimum erasing power based on the identification information stored in the storage.

5. The optical recording apparatus according to claim 3 further comprising a reader to read identification information written in a specific area of the optical storage medium and indicating the optimum erasing power, wherein the recorder determines the optimum erasing power based on the identification information read by the reader.

6. The optical recording apparatus according to claim 3 further comprising a reflectivity detector to obtain the reflectivity R0 and a plurality of reflectivities R1 to the erasing power and select a combination that satisfies the expression (1) from among combinations of the reflectivity R0 and the reflectivities R1, wherein the recorder determines the optimum erasing power based on the combination selected by the reflectivity detector.

7. The optical recording apparatus according to claim 3, wherein a power ratio $\epsilon$, wherein $\epsilon = Pe/Pw$, of the erasing power to the recording power is $0.20 \leq \epsilon \leq 0.40$ in which Pe is the erasing power and Pw is the recording power.

8. A phase-change optical storage medium comprising:

a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power, wherein the recording layer has been initialized with an initialization laser beam having the erasing power satisfying expressions (1) and (2):

$$1.000 < (R1/R0) < 1.030 \tag{1}$$

$$0.030 < (R10/R0) - (R1/R0) < 0.150 \tag{2}$$

in which R0 is a reflectivity exhibited by an un-recorded section of the recording layer, on which no data has ever been recorded, when irradiated with a reproducing light beam, R1 is a reflectivity exhibited by the un-recorded section when irradiated with the reproducing light beam after irradiated once with a light beam having the erasing power, and R10 is a reflectivity exhibited by the un-recorded section when irradiated with the reproducing light beam after irradiated ten times with a light beam having the erasing power.

9. The optical storage medium according to claim 8 having a specific area written on which is information that sets a power ratio $\epsilon$, wherein $\epsilon = Pe/Pw$, of the erasing power to the recording power in $0.20 \leq \epsilon \leq 0.40$ in which Pe is the erasing power and Pw is the recording power.

10. The optical storage medium according to claim 8, wherein the recording layer has been initialized with a requirement $1.20 \leq Di \leq 1.55$ in which Di is an initialization laser-power density obtained by dividing a power of the initialization laser beam by an area irradiated with the initialization laser beam, and dividing a resultant quotient by a scanning speed of the initialization laser beam.

11. An optical recording method of recording information to be recorded in a recording layer of a phase-change optical storage medium, the method comprising the steps of:

a modulation step of modulating the information to be recorded to generate modulated data;

a mark-length generation step of generating desired mark-length data based on the modulated data; and a recording step of generating a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiating a recording light beam onto the recording layer in accordance with the recording pulse pattern to record at least one recorded mark representing the information to be recorded, wherein the recording step performs recording at a recording linear velocity selected from among a first recording linear velocity Vl, a second recording linear velocity Vm, and a third recording linear velocity wherein Vl<Vm<Vh, to the recording layer, and in the recording step, recording at the first recording linear velocity Vl, recording at the second recording linear velocity Vm, and recording at the third recording linear velocity Vh satisfy a relationship indicated by an expression (1):

$$\epsilon h < \epsilon m < \epsilon l \tag{1}$$

in which $\epsilon l$ is a first power ratio obtained by dividing a first erasing power Pel by a first recording power Pwl at the first recording linear velocity Vl, $\epsilon m$ is a second power ratio obtained by dividing a second erasing power Pem by a second recording power Pwm at the second recording linear velocity Vm, and $\epsilon h$ is a third power ratio obtained by dividing a third erasing power Peh by a third recording power Pwh at the third recording linear velocity Vh.

12. The optical recording method according to claim 11, wherein the recording at the first recording linear velocity Vl and the recording at the third recording linear velocity Vh in the recording step satisfy a relationship indicated by an expression (2):

$$0.45 < \alpha < 0.80 \tag{2}$$

in which α is εh/εl, a ratio between the third power ratio εh and the first power ratio εl.

13. The optical recording method according to claim 11, wherein the recording at the first recording linear velocity Vl, the recording at the second recording linear velocity Vm, and the recording at the third recording linear velocity Vh in the recording step satisfy a relationship indicated by an expression (3):

Pwl<Pwm<Pwh (3).

14. An optical recording apparatus for recording information to be recorded in a recording layer of a phase-change optical storage medium, comprising:
an encoder to modulate the information to be recorded to generate modulated data;
a mark-length generator to generate desired mark-length data based on the modulated data; and
a recorder to generate a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiate a recording light beam onto the recording layer in accordance with the recording pulse pattern to record at least one recorded mark representing the information to be recorded,
wherein the recorder performs recording at a recording linear velocity selected from among a first recording linear velocity Vl, a second recording linear velocity Vm, and a third recording linear velocity wherein Vl<Vm<Vh, to the recording layer, and
recording at the first recording linear velocity Vl, recording at the second recording linear velocity Vm, and recording at the third recording linear velocity Vh performed by the recorder satisfy a relationship indicated by an expression (1):

εh<εm<εl (1)

in which εl is a first power ratio obtained by dividing a first erasing power Pel by a first recording power Pwl at the first recording linear velocity Vl, εm is a second power ratio obtained by dividing a second erasing power Pem by a second recording power Pwm at the second recording linear velocity Vm, and εh is a third power ratio obtained by dividing a third erasing power Peh by a third recording power Pwh at the third recording linear velocity Vh.

15. The optical recording apparatus according to claim 14, wherein the recording at the first recording linear velocity Vl and the recording at the third recording linear velocity Vh performed by the recorder satisfy a relationship indicated by an expression (2):

0.45<α<0.80 (2)

in which α is εh/εl, a ratio between the third power ratio εh and the first power ratio εl.

16. The optical recording apparatus according to claim 14, wherein the recording at the first recording linear velocity Vl, the recording at the second recording linear velocity Vm, and the recording at the third recording linear velocity Vh performed by the recorder satisfy a relationship indicated by an expression (3):

Pwl<Pwm<Pwh (3).

17. A phase-change optical storage medium comprising:
a recording layer, to be recorded on which is at least one recorded mark representing information to be recorded by irradiating a recording light beam onto the recording layer in accordance with a recording pulse pattern of recording pulses rising from an erasing power and formed between a recording power larger than the erasing power and a bottom power smaller than the erasing power and of erasing pulses rising from the bottom power to the erasing power,
wherein written in a specific area of the recording layer is identification information that indicates a recording power and an erasing power peculiar to each of a first recording linear velocity Vl, a second recording linear velocity Vm, and a third recording linear velocity wherein Vl<Vm<Vh,
in the identification information, a first power ratio εl obtained by dividing a first erasing power Pel by a first recording power Pwl at the first recording linear velocity Vl, a second power ratio εm obtained by dividing a second erasing power Pem by a second recording power Pwm at the second recording linear velocity Vm, and a third power ratio εh obtained by dividing a third erasing power Peh by a third recording power Pwh at the third recording linear velocity Vh satisfy a relationship indicated by an expression (1):

εh<εm<εl (1).

18. The optical storage medium according to claim 17, wherein the identification information satisfies a relationship indicated by an expression (2):

0.45<α<0.80 (2)

in which α is εh/εl, a ratio between the third power ratio εh and the first power ratio εl.

19. The optical storage medium according to claim 17, wherein the identification information satisfies a relationship indicated by an expression (3):

Pwl<Pwm<Pwh (3).

* * * * *